United States Patent [19]

Yomogida et al.

[11] 4,249,248
[45] Feb. 3, 1981

[54] PROGRAMMABLE SEQUENCE CONTROLLER WITH AN ARITHMETIC OPERATION FUNCTION

[75] Inventors: Toshihiko Yomogida, Kariya; Tsuyoshi Yokota, Okazaki, both of Japan

[73] Assignee: Toyoda-Koki Kabushiki-Kaisha, Aichi, Japan

[21] Appl. No.: 14,280

[22] Filed: Feb. 23, 1979

[30] Foreign Application Priority Data

Feb. 27, 1978 [JP] Japan .................................. 53-21940

[51] Int. Cl.³ ..................... G06F 15/46; G06F/15/16
[52] U.S. Cl. ................................................. 364/900
[58] Field of Search ... 364/200 MS File, 900 MS File

[56] References Cited

U.S. PATENT DOCUMENTS

| | | | |
|---|---|---|---|
| 3,854,353 | 12/1974 | Cutler | 364/200 |
| 3,944,984 | 3/1976 | Moorley | 364/200 |
| 4,034,354 | 7/1977 | Simmons | 364/900 |
| 4,064,395 | 12/1977 | Schubeler | 364/900 |
| 4,077,060 | 2/1978 | Bodner et al. | 364/200 |
| 4,079,455 | 3/1978 | Ozga | 364/200 |
| 4,086,658 | 4/1978 | Finlay | 364/900 |
| 4,129,901 | 12/1978 | Masuda | 364/104 |

Primary Examiner—Mark E. Nusbaum
Assistant Examiner—David Y. Eng
Attorney, Agent, or Firm—Oblon, Fisher, Spivak, McClelland & Maier

[57] ABSTRACT

A programmable sequence controller wherein a logic operation processor controls a program counter so as to successively read out from a sequence memory sequence instructions, which are applied to an input and output selector for selectively designating a plurality of input and output elements as well as to the logic operation rocessor. The logic operation processor is programmed to test the operational states of one or more input elements when receiving test commands and to output an energization or deenergization signal based upon the test result when receiving an output command. An output drive device is provided, which energizes or deenergizes selected one of the output elements in response to the energization or deenergization signal. Each of the sequence instructions includes therein any of an arithmetic operation command and the test and output commands, and when the arithmetic operation command is read out, an interrupt is applied to an arithmetic operation processor, which is thus enabled to execute the arithmetic operation command.

4 Claims, 23 Drawing Figures

INSTRUCTIONS FOR TEST, OUTPUT, ADDITION, SUBTRACTION & MONITORING

JUMP INSTRUCTION

TRANSFER INSTRUCTION

Fig. 8

| Address | |
|---|---|
| 0000 | JUMP PROCESSING PROGRAM |
| 0064 | RQI PROCESSING PROGRAM |
| 0128 | ADDITION PROGRAM |
| 0136 | SUBTRACTION PROGRAM |
| 0144 | COMPARISON PROGRAM |
| 0160 | TRANSFER PROGRAM |
| 0176 | INTERRUPT PROCESSING PROGRAM |
| 0192 | MONITORING PROGRAM 1 |
| ~ | ~ |
| 1983 | MONITORING PROGRAM n |
| 2047 | |
| 2048 | |
| 3071 | |

ROM AREA: 0000–2047
RAM AREA: 2048–3071

Fig. 6

| MEMORY ADDRESS | SEQUENCE CONTROL PROGRAM | |
|---|---|---|
| 0100 | TNO | 200 |
| 0101 | TFE | 203 |
| 0102 | TNA | 201 |
| 0103 | JMY | 105 |
| 0104 | TNA | 400 |
| 0105 | TFA | 202 |
| 0106 | YON | 400 |
| 0107 | TFA | 206 |
| 0108 | TNA | 400 |
| 0109 | TRR | 2001 |
| 0110 | I/O UNIT | 15 |
| 0111 | A - REGISTER | |
| 0112 | TNA | 2001 |
| 0113 | TRR | 2002 |
| 0114 | I/O UNIT | 17 |
| 0115 | B - REGISTER | |
| 0116 | TNA | 2002 |
| 0117 | CMP | 2003 |
| 0118 | TNA | 400 |
| 0119 | TNA | 2004 |
| 0120 | YON | 401 |
| ⋮ | ⋮ | ⋮ |
| 3999 | JMP | 0000 |

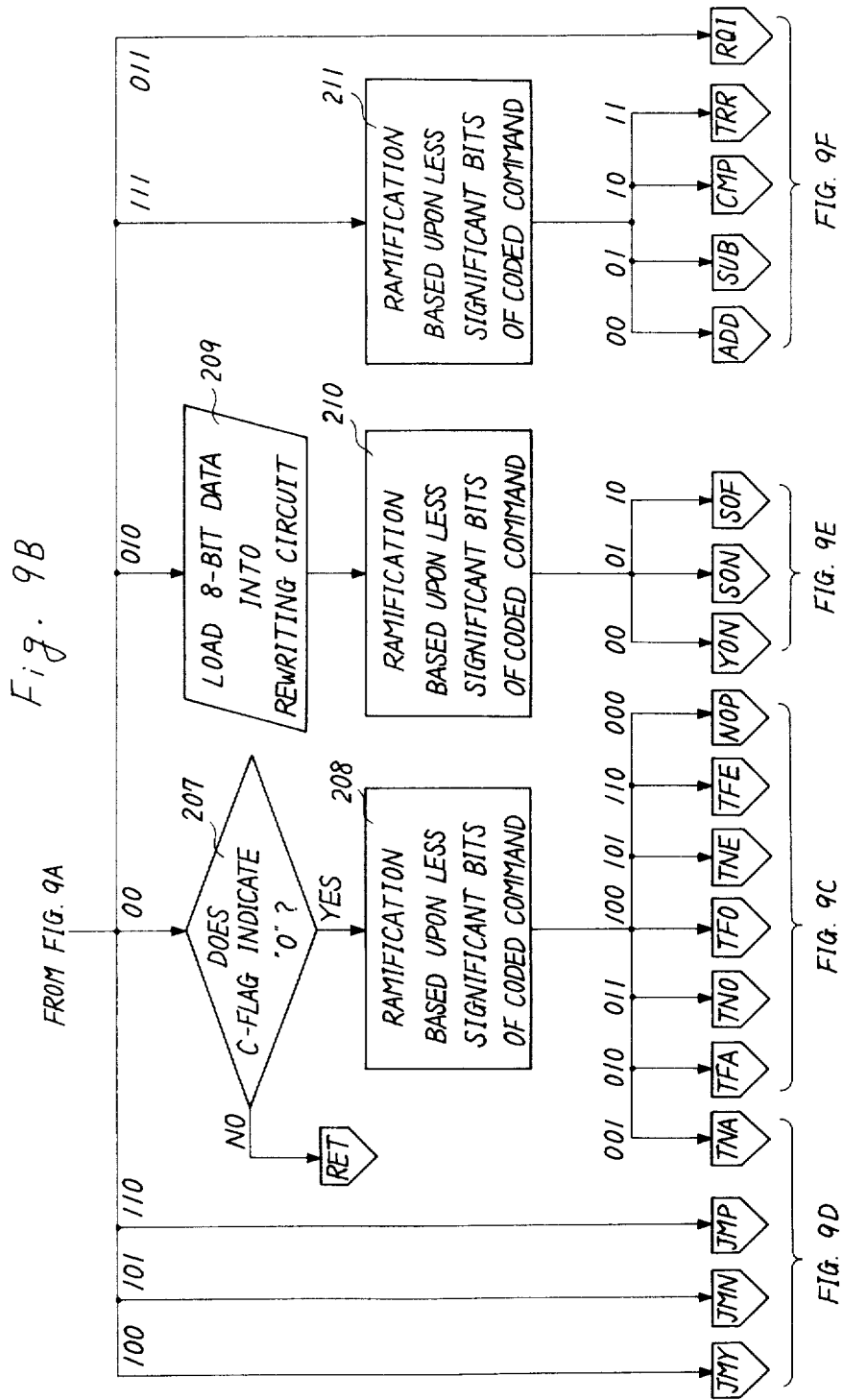

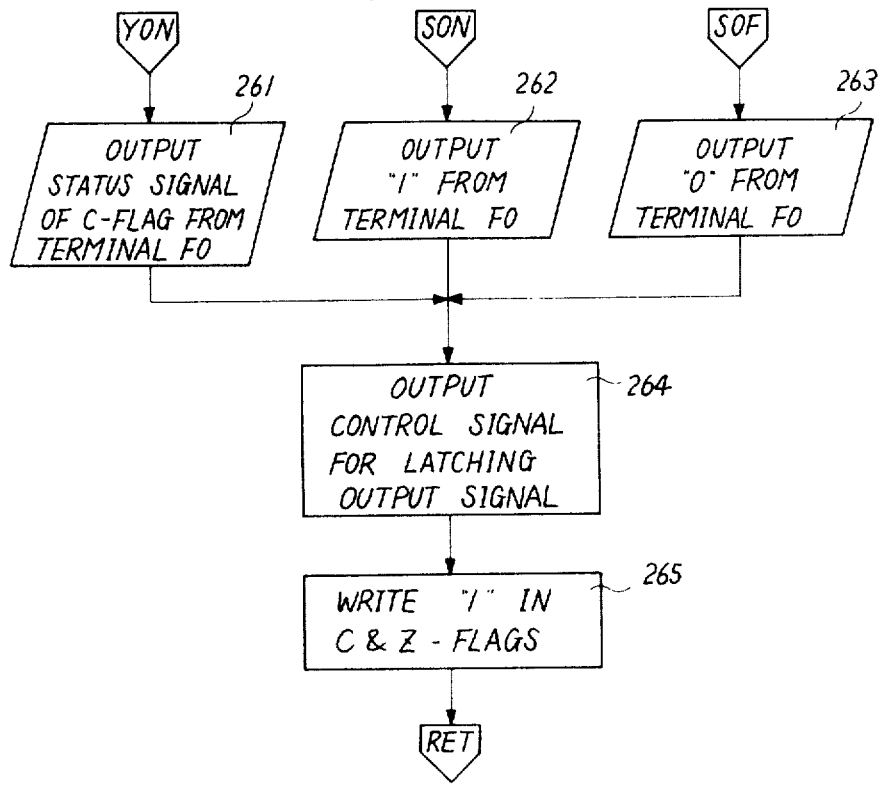

Fig. 10

ADDITION (START)

→ READ CONTENT OF A-REG.

→ READ CONTENT OF B-REG.

→ ADD CONTENT OF B-REG. WITH THAT OF A-REG.

→ OUTPUT SUM TO A-REG.

→ JMI

Fig. 11

SUBTRACTION (START)

→ READ CONTENT OF A-REG.

→ READ CONTENT OF B-REG.

→ SUBTRACT CONTENT OF B-REG. FROM THAT OF A-REG.

→ OUTPUT DIFFERENCE TO A-REG.

→ JMI

Fig. 12

TRANSFER (START)

→ PC + 1

→ READ OUT DATA FROM SEQUENCE MEMORY

→ READ DATA FROM ELEMENT DESIGNATED BY READ-OUT DATA

→ PC + 1

→ READ OUT DATA FROM SEQUENCE MEMORY

→ OUTPUT STORED DATA TO ELEMENT DESIGNATED BY READ-OUT DATA

→ JMI

MONITORING

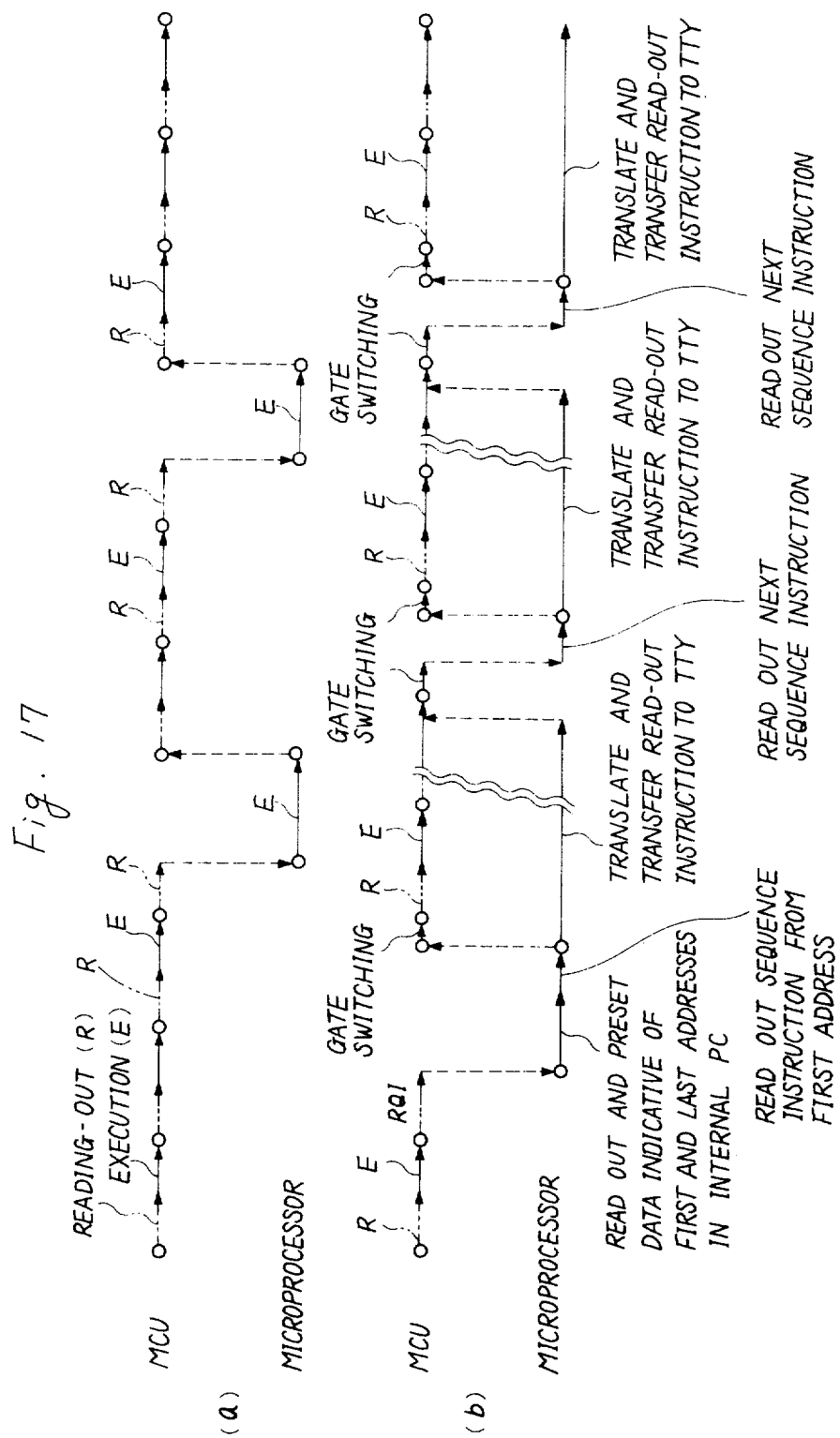

PROGRAMMABLE SEQUENCE CONTROLLER WITH AN ARITHMETIC OPERATION FUNCTION

BACKGROUND OF THE INVENTION

The present invention relates to a programmable sequence controller of the type that in addition to a logic operation processor, is provided also with an arithmetic operation processor for executing arithmetic operation commands included, though being unable to be executed by the logic operation processor, in a sequence control program.

With the requirements for complicated sequence control, there has recently become necessary a sequence controller wherein an arithmetic operation function for addition, substraction, comparison, etc. is given in addition to a logic operation function for testing the operational states (i.e. ON-OFF) of input elements such as limit switches, magnetic relays, etc. with the results of energizing or deenergizing a selected one of the output elements based upon the results of such tests.

For the purpose of meeting such requirement, an attempt may be made to use as operation processing means of sequence controllers a microcomputer which is capable of executing both logic and arithmetic operations. In this attempt, however, drawbacks may be raised in that the format of instruction words of the microcomputer and the architecture of the same are not necessarily suitable to the execution of sequence control programs and in that high speed execution of sequence control programs is impossible since each sequence control instruction cannot be executed without executions of several tens of microcomputer program instructions. Therefore, a scan cycle time taken to scan once all of stored sequence control instructions is rendered longer than the response time of conventional relay circuits, and this invites inconvenience in sequence control.

Further, there has heretofore been suggested a sequence controller which in addition to a high-speed logic operation processor of random logic type, is provided with an arithmetic operation processor composed of a microcomputer. In this controller, logic operation commands are executed by the high-speed logic operation processor, while arithmetic operation commands such as addition commands, subtraction commands, etc. which are unable to be executed by the logic operation processor are executed by the arithmetic operation processor, and it is thus possible to execute the arithmetic operations without substantially slowing the execution speed of the logic operations.

Where like this, a part of a sequence control is executed by the arithmetic operation processor, the logic operation processor must decode any read-out sequence instruction of the sequence control program so as to issue instructions regarding operations that the arithmetic operation processor is to execute, and the arithmetic operation processor must send out a completion signal to inform the logic operation processor that the arithmetic operation processor has completed its operation to execute. To this end, the prior sequence controller is provided with an information exchange memory accessible by both of the logic and arithmetic operation processors, and the operation instructions and the completion signal are exchanged between the processors by writing a logic value "1" into predetermined bits of a certain memory area of the information exchange memory and by reading out the signal statuses of the predetermined bits. It is therefore necessary for the prior art sequence controller to be also provided with, in addition to the information exchange memory, an access control circuit which periodically switches memory addresses of the information exchange memory for enabling the logic and arithmetic operation processors to alternately access the exchange memory.

Moreover, the prior art sequence controller involves the following problems due to the fact that the two operation processors cooperate in the above-described manner. First, the execution of sequence control must be halted to prevent the access by the logic operation processor to the information exchange memory while the access thereto is made by the arithmetic operation processor. This causes the scan cycle time that is taken to execute once all instructions of a sequence control program to be extended or prolonged so that unfavorable influences are exerted upon sequence control operation. Secondly, when a sequence instruction including an arithmetic operation command is read out from a sequence program memory, the logic operation processor only instructs through the information exchange memory the arithmetic operation processor to execute the arithmetic operation command, before reading out the next contiguous sequence instruction. Although the completion of operation by the arithmetic operation processor is immediately communicated to the logic operation processor through the exchange memory, the result of the arithmetic operation is not immediately reflected in the sequence control, but is reflected on that in a successive scan cycle. That is, in the prior art sequence controller, the delay of one scan cycle time is made until the result of any arithmetic operation is reflected on the flow of the controlled sequence, and this causes inconvenience in sequence control. Particularly, where there is required a sequence control in which a plurality of data are added for comparison with a preset value and in which the control flow is changed in dependence upon the results of such comparison, a sequence program therefor is programmed in such a way of confirming the completion of one arithmetic operation in advance of the execution of a successive arithmetic operation, and therefore, the delay of one scan cycle time is made each time one arithmetic operation is executed. For this reason, it may practically be impossible for the prior art sequence controller to execute a sequence program which includes a plurality of arithmetic operation commands each causing time delay in sequence control.

SUMMARY OF THE INVENTION

Accordingly, it is a primary object of the present invention to provide an improved programmable sequence controller wherein an interrupt is applied to an arithmetic operation processor so as to cause the same to execute an arithmetic operation command only when a sequence instruction including the arithmetic operation command is read out from a sequence program memory so that any arithmetic operation necessary for a sequence control is immediately executed without prolonging the scan cycle time concerning the sequence program.

Another object of the present invention is to provide an improved programmable sequence controller wherein a logic operation processor for executing sequence instructions is programmed to wait while an arithmetic operation processor executes an arithmetic operation instructed from the logic operation processor so that no delay of one scan cycle time is made until the result of the arithmetic operation is reflected in the flow of the controlled sequence.

A further object of the present invention is to provide an improved programmable sequence controller capable of executing a sequence control program including a plurality of arithmetic commands without exerting upon the sequence control unfavorable influences caused by the execution of the arithmetic operation commands.

A still further object of the present invention is to provide an improved programmable sequence controller provided as a logic operation processor with a microprogram control unit which cooperates with a microprogram memory for storing a microprogram used to execute a sequence control program.

Briefly, according to the present invention, there is provided a programmable sequence controller which comprises a sequence program memory for storing a sequence control program composed of a plurality of sequence instructions, each of the instructions including any of a test command, an output command and an arithmetic operation command, a program counter for selectively designating memory addresses of the program memory so as to successively read out therefrom the sequence instructions, an input and output selecting device responsive to address data included in any read-out sequence instruction for selectively designating a plurality of input and output elements, an output drive device for energizing or deenergizing any selected output element in response to an energization or deenergization signal, and a logic operation processing device including a test flag. The processing device is programmed to control the content of the program counter and to write the operational state signal of any selected input element into the test flag under a test condition designated by the test command when the same is read out from the program memory. The processing device is further programmed to selectively output the energization and deenergization signals based upon the status of the test flag when receiving the output command. A signalling device is also included in the logic operation processing device for outputting an interrupt signal when the processing device receives the arithmetic operation command from the program memory. The sequence controller is further provided with an arithmetic operation processing device, which includes at least one data storage for receiving externally provided digital data. The arithmetic operation processing device is responsive to the interrupt signal, so that it is enabled to arithmetically process the digital data in accordance with the arithmetic operation command.

In the sequence controller according to one aspect of this invention, when it is confirmed that a sequence instruction read out from the program memory includes an arithmetic operation command to be executed by the arithmetic operation processing device, an interrupt is applied to the arithmetic operation processing device, which is thus enabled to execute the read-out sequence instruction. It is therefore possible to allot the sequence control operation to the two operation processing devices without providing any information exchange memory, as used in the prior art sequence controller, for cooperation between two operation processing devices and any switching circuit for enabling the processing devices to make access to the exchange memory. The sequence controller according to the present invention is not only simplified in construction as compared with the prior art sequence controller, but also advantageous in the following respect. That is, as access to such information exchange memory is unnecessary, prolonging of the scan cycle time is avoided due to the fact that the execution of the sequence program is halted during the time that is taken for the arithmetic operation processing device to make access to the information exchange memory. This makes it possible to scan a sequence program including arithmetic operation commands within almost the same period of time as taken to scan a sequence program including logic operation commands only.

In another aspect of this invention, the processing operation of the logic operation processing device is halted at the same time as the application of an interrupt to the arithmetic operation processing device and is restarted to execute a successive sequence instruction when the arithmetic operation processing device completes its processing operation. The result of an arithmetic operation or a comparison operation is immediately reflected on the execution of a successive sequence instruction and is concerned in altering the flow of controlled sequence. Accordingly, the delay by one scan cycle time of the reflection of the result of any arithmetic operation on the execution of a successive sequence instruction as is in the case of the prior art sequence controller can be avoided, and this results in the achievement of reliable sequence control. Particularly, the sequence controller according to the present invention is of great advantage in executing a sequence control program including a plurality of arithmetic operation commands, since no substantial delay is caused by the execution of each arithmetic operation.

BRIEF DESCRIPTION OF THE DRAWINGS

Various other objects, features and attendant advantages of the present invention will readily be appreciated as the same becomes better understood by reference to the following detailed description of a preferred embodiment when considered in connection with the accompanying drawings, wherein like reference numerals designate like or corresponding parts throughout the several views, and in which:

FIG. 6 is an explanatory representation of a program sheet on which a sequence control program is programmed by the use of command words defined in TABLE 1 for performing the same function as the relay circuit shown in FIG. 5;

FIG. 8 is an explanatory representation of data locations in a microprocessor memory;

FIGS. 9A-F are flow charts constituting together a microprogram stored in a microprogram memory;

FIGS. 10-15 are flow charts respectively showing an addition program, a subtraction program, a transfer program, a comparison program, an interrupt processing program and a monitoring program stored in the microprocessor memory;

FIG. 16 is an explanatory representation of a program sheet showing a part of sequence control program; and FIG. 17 is a time chart describing the operation of the sequence controller according to the present invention.

DETAILED DESCRIPTION OF A PREFERRED EMBODIMENT

Figure 1A:
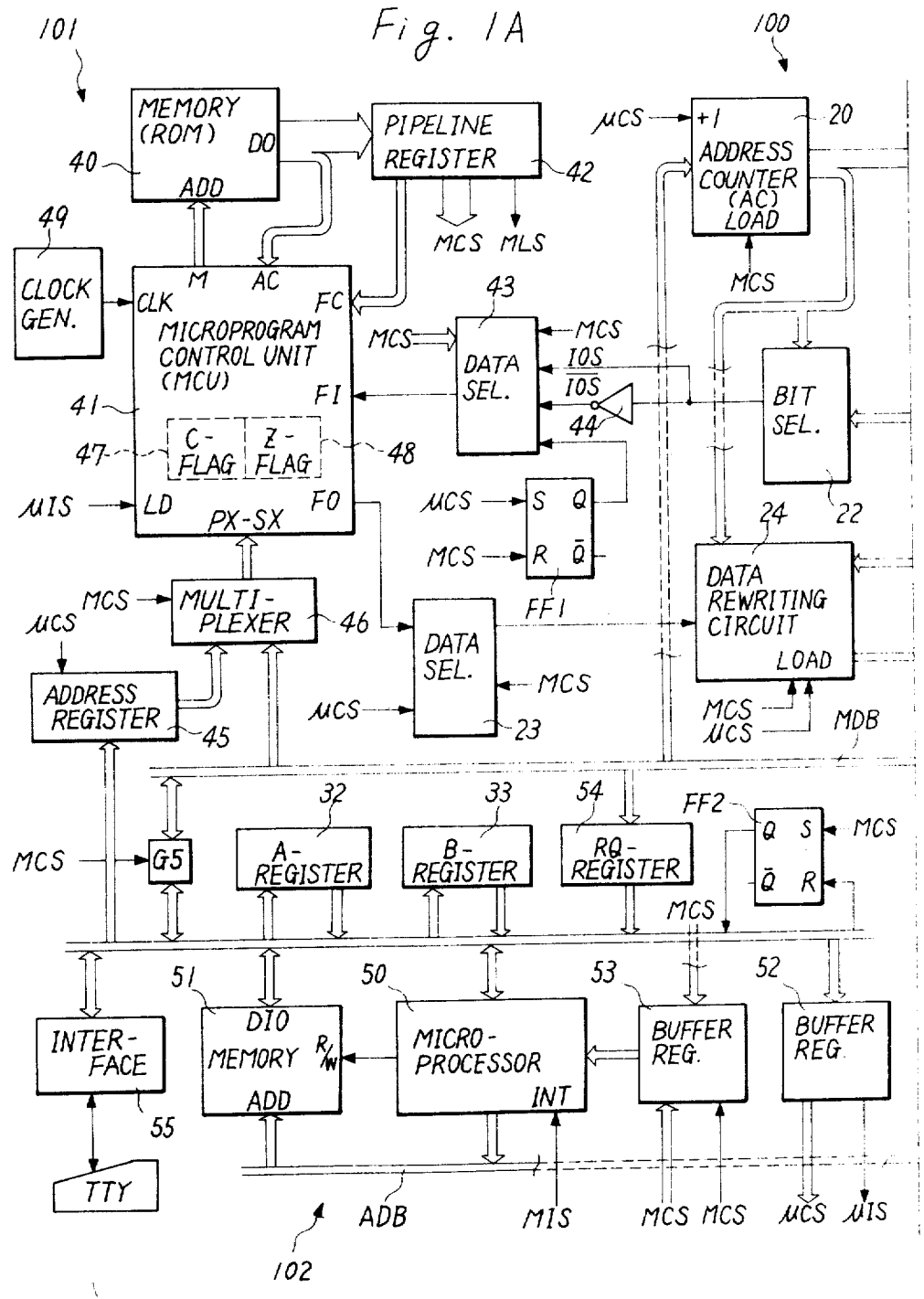
FIGS. 1A-B are block diagrams of a programmable sequence controller with an arithmetic operation function according to the present invention.
Figure 1B:
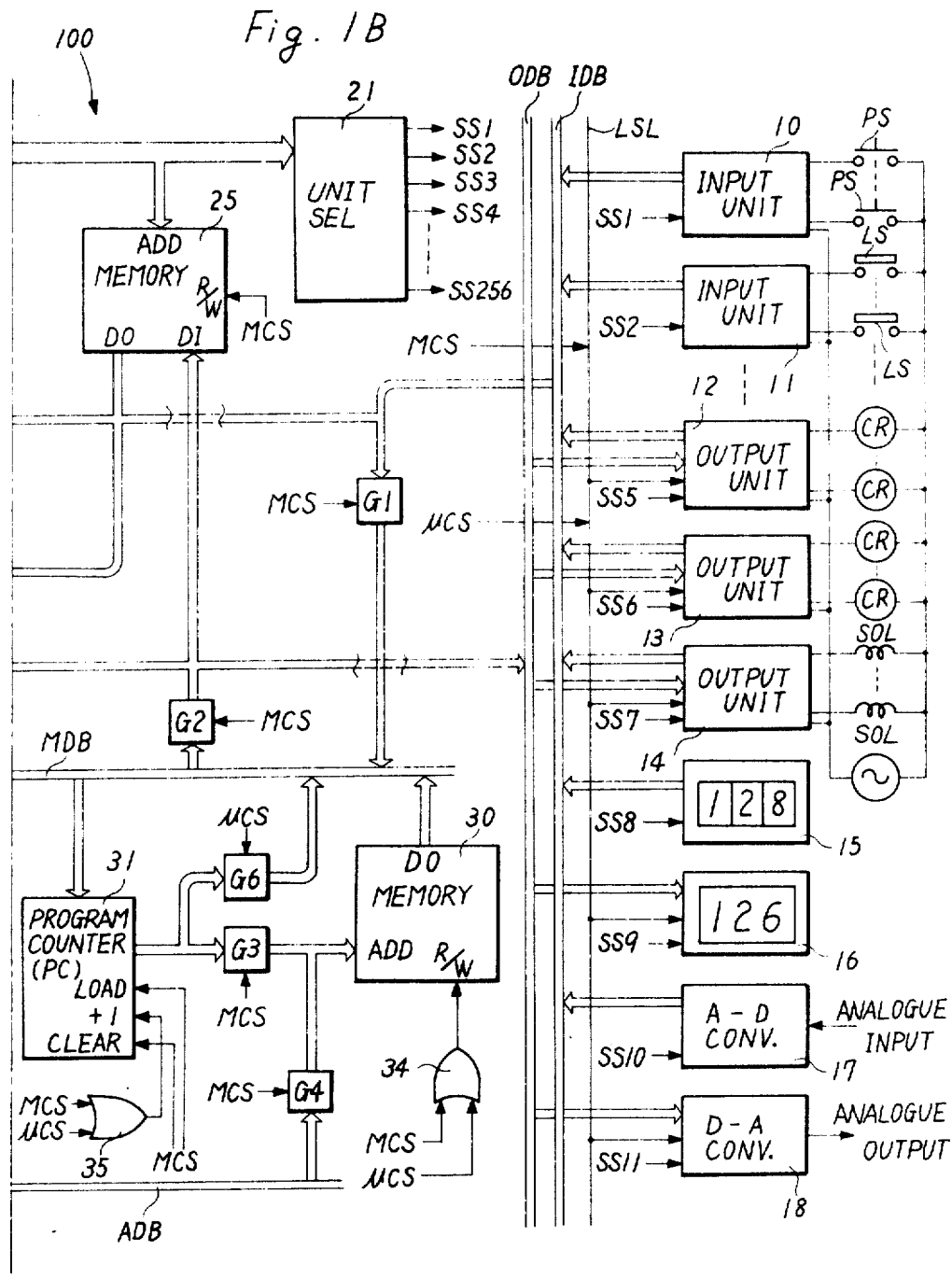

Referring now to the drawings and particularly to FIGS. 1A-B, a programmable sequence controller according to the present invention is illustrated comprising a plurality of input and output cards or units 10-18, which are connected to an input/output (I/O) selection section 100 through an input data bus IDB, an output data bus ODB, and a latch signal line LSL. The I/O units 10-18, comprise a digital setting device 15, a digital numeric display device 16, an analog-to-digital (A-D) converter 17, a digital-to-analog (D-A) converter 18 etc. in addition to input units 10, 11 and output drive units 12-14 which are provided for conventional sequence control.

The input units 10, 11 are provided for converting the opening and closing of any of input elements such as push button switches PS, limit switches LS etc. connected thereto into ON and OFF signals of a so-called "TTL" level and are each connected to eight-input elements. The input units 10, 11 are responsive respectively to selection signals SS1 and SS2 each for applying onto the input data bus IDB 8-bit data indicative of the open and closed states of the eight input elements connected thereto. The output drive units 12-14 are provided for controlling the energizations and deenergizations of output elements such as magnetic relays OR and solenoids SOL and are each connected to eight-output elements. Each of the output drive units 12-14 are provided therein with eight-flip-flops, not shown. When a selection signal SS is applied to one of the output drive units 12-14 in addition to the application of the latch signal to the latch signal line LSL, the 8-bit signals output onto the output data bus ODB are stored respectively into the flip-flops of the selected one of the output drive units 12-14, so that eight-output elements connected thereto are simultaneously energized or deenergized. Further, when any of the output drive units 12-14 is selected for the test of I/O elements, signals indicative of the operational states of eight-flip-flops provided in the selected output drive unit are applied as signals representing ON and OFF states of output elements connected to the selected output unit, onto the input data bus IDB.

The digital setting device 15 is provided for setting therein, for example, a cumulative weight of workpieces containable into a bucket, and a decimal number of three digits set in the setting device 15 is converted into the form of binary code for application onto the input data bus IDB. The numeric display device 16 is provided for converting binary coded data of 8-bits appearing on the output data bus ODB, into a decimal number so as to display the same. The display device 16 performs such conversion and display upon receiving the latch signal in addition to the selection signal SS9. The A-D converter 17 converts an analog value input thereto into binary coded data of 8-bits for application onto the input data bus IDB, while the D-A converter 18 converts 8-bit digital data appearing on the output data bus ODB into an analog value for outputting the same externally. These converters 17, 18 are connected to analog type measuring devices analog type display devices, servomotors, etc. for analog control.

The I/O selection section 100 comprises an address counter 20, a unit selector 21, a bit selector 22, a data rewriting circuit 24 and gates G1, G2. The selection 100 is given a first function for selecting the input and output elements connected to the input units 10, 11 and to the output drive units 12-14 on an element-by-element basis and a second function for selecting the digital setting device 15, the digital display device 16 etc. on a unit-by-unit basis. The address counter 20, when receiving a signal at its load terminal LOAD, loads thereinto I/O address data included in an operand portion of each of sequence instructions successively read out from a sequence program memory 30 and, when receiving a signal at its step-up terminal +1, advances by one the I/O address data loaded thereinto. In this particular embodiment, the I/O address data is composed of 11-bits, whose more significant 8-bits are used for address designation on the unit-by-unit basis. It will therefore be realized that up to 256-I/O units are selectable by means of the more significant 8-bit address data. Of the 11-bit address data loaded into the address counter 20, the more significant 8-bit data is applied to the unit selector 21, and less significant 3-bit data is applied to the bit selector 22 and the rewriting circuit 24. The unit selector 21 for selection of the I/O units 10-18 is arranged to output selection signals SS7-SS256 by decoding the more significant 8-bit address data applied thereto. The bit selector 22 is arranged to select one bit signal from the 8-bit data, appearing on the input data bus IDB, based upon the less significant 3-bit I/O address data supplied from the address counter 20, so that the ON or OFF signal of an input or output element designated by the 11-bit I/O address data is output from the bit selector 22.

Figure 2:
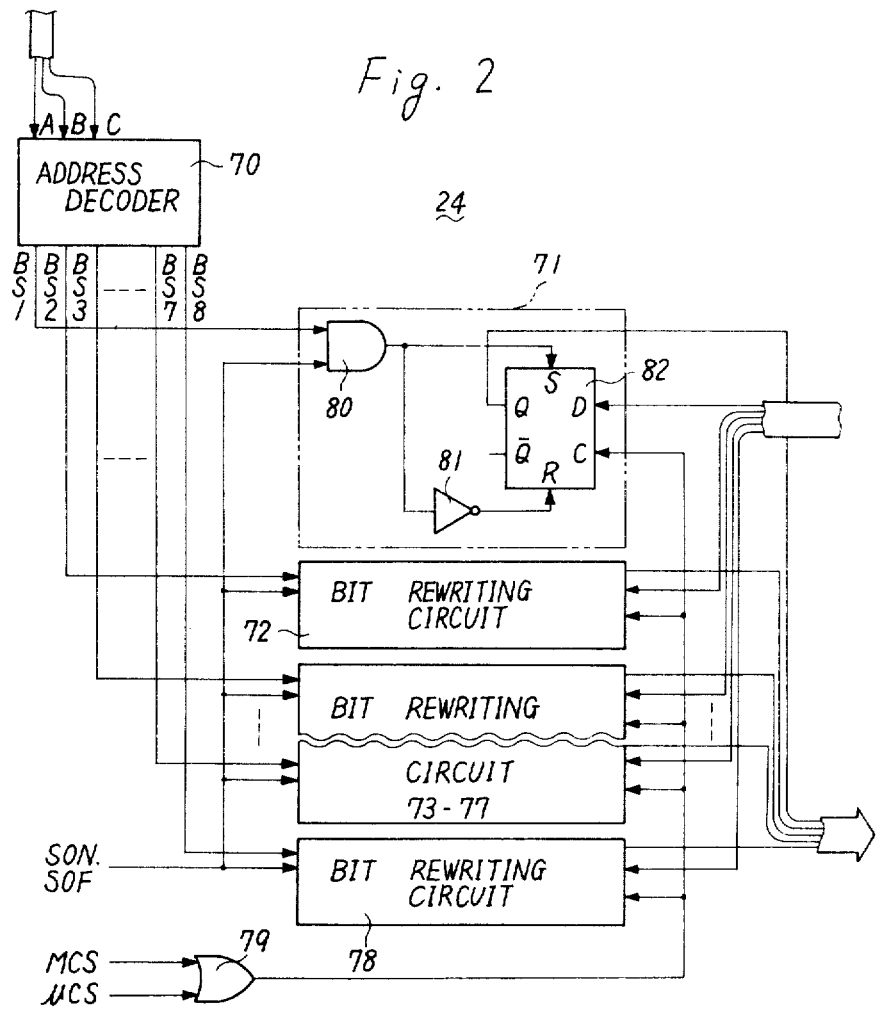
FIG. 2 is a detailed block diagram of a data rewriting circuit shown in FIG. 1A.

The data rewriting circuit 24 is provided for execution of output instructions, and the function of this circuit 24 is to select from the 8-bit data signals applied from any selected one of the output drive units 12-14, one bit data signal designated by the less significant 3-bit I/O address data, then to rewrite the selected one bit data signal by an output command signal applied from an operation processing section referred to later, and to send the rewritten 8-bit data signals back to the any selected one of the output drive units 12-14. FIG. 2 illustrates the block diagram of the data rewritting circuit 24, which comprises a bit address decoder 70, first to eight-bit rewriting circuits 71-78 and an OR gate 79. The bit address decoder 70 selectively generates bit selection signals BS1 to BS8 in response to the less significant 3-bit I/O address data applied from the address counter 20. As typically shown with respect to the first bit rewriting circuit 71, each of the bit rewriting circuits 71-78 is composed of an AND gate 80 connected to receive an associated one of the bit selection signals BS1-BS8 and the output command signal, an inverter 81 connected to an output terminal of the AND gate 80, and a flip-flop 82 connected at set and reset terminals S, R, thereof respectively to the AND gate 80 and the inverter 81. The flip-flop 82 of each of the circuits 71-78 is further connected to receive at a data input terminal D thereof a corresponding one of the 8-bit data signals from the data input bus IDB and also to receive at a clock terminal C thereof one of control signals MCS and $\mu$SC, referred to later, through the OR gate 79. Accordingly, when one of the control signals MCS and μCS is applied to the OR gate 79 and one of the bit selection signals BS1-BS8 is generated, then the flip-flops 82 of the bit selection circuits except for that selected by the one of the bit selection signals BS1-BS8 are set or reset in dependence respectively upon the associated signals of the 8-bit data signals applied from the input data bus IDB, while the flip-flop 82 of that selected by the one of the bit selection signals BS1-BS8 is set or reset in dependence upon the output command signal applied from the data selector 23 regardless of the associated one signal of the 8-bit data signals. Assuming now that "1" and "0" in logical representation respectively denote either the ON and OFF state signals of any I/O element or the ON and OFF command signals to energize and deenergize any output element, a data rewriting is effected either when a selected one of the bit rewriting circuits 71-78 receives the ON command signal SON and the OFF state signal respectively at the AND gate 80 and the data input terminal D of the flip-flop 82 thereof or when it receives the OFF command signal SOF and the ON state signal respectively at the AND gate 80 and the data input terminal D. The flip-flops 82 of the bit rewriting circuits 71-78 are connected at their set output terminals Q to the output data bus ODB so as to send the rewritten 8-bit data signals back to one of the output drive units 12-14 being designated by the unit selector 21. Thus, one of output elements designated by the 11-bit I/O address data is energized when the ON command signal "1" is applied to the data rewriting circuit 24 or is deenergized when the OFF command signal "0" is applied to the data rewriting circuit 24. Further, the bit selector 22 outputs a signal "1" when selecting an ON state signal from the 8-bit data signals applied from the input data bus IDB.

The gates G1, G2 respectively connect the input data bus IDB and the output data bus ODB to a main data bus MDB provided in the operation processing section of the sequence controller. By loading the more significant 8-bit I/O address data to the unit selection 21 and by switching the gates G1 and G2, data from a selected one of the I/O units 10-18 is applied onto the main data bus MDB, or data appearing on the main data bus MDB is transferred to the selected one of the I/O units 10-18. A dummy output memory 25 is provided for storage of dummy outputs in sequence control and is constructed from a rewritable semiconductor memory. The more significant 8-bit I/O address data is applied to the dummy output memory 25, so that the memory 25 is enabled to read out the ON-OFF command signal from and write the same in any selected memory bit in the same manner as the data reading-out and writing from and in the input units 10, 11 and the output drive units 12-14. In this particular embodiment, the dummy output memory 25 has a memory capacity of 128 words each comprising 8-bits, and address numbers 1025-2048 are assigned to all the memory bits of the memory 25.

A sequence memory 20 for storing a sequence control program is constructed from a core memory and has a memory capacity of 8K-words each comprising 16-bits. Thus, 13-bit data of binary code are used for designation of the 8K-word memory addresses of the sequence memory 30. A program counter 31 is provided for selectively designating the addresses of the sequence memory 30 so as to successively read out sequence instructions therefrom and is constructed from a 13-bit binary counter. The program counter 31 is provided with a load terminal LOAD, a step-up terminal +1 and a clearing terminal CLEAR and, when receiving signals at these terminals respectively, affects loading data thereinto, incrementing by one the data being stored therein and clearing the data. An OR gate 35 is provided to apply any of control signals MCS and μCS to the step-up terminal (+1). The content of the program counter 31 is applied through a gate G3 to a 13-bit address terminal ADD of the sequence memory 30, to which data appearing on an address data bus ADB is also applied through a gate G4. Thus, the switching of the gates G3, G4 makes it possible to designate any memory address of the sequence memory 30 by the data supplied from the program counter 31 or by the data appearing on the address data bus ADB. The output terminal of the program counter 31 is further connected to the main data bus MDB through a gate G6, and the 13-bit address data from the program counter 31 is output onto the main data bus MDB at the opening of the gate G6.

The kinds of sequence control commands stored in the sequence memory 30 and the manner in which the sequence control commands and I/O address data are stored will now be described. A detailed description of the operation processing section will be given later. A sequence control program used in this particular embodiment is programmed based upon a relay ladder diagram depicting a sequence control to be executed. Command words as defined in the following TABLE 1 are used for such programming.

TABLE 1

| Command Words | | Codes | | Meaning |
|---|---|---|---|---|
| Test Commands | TNA | 00 | 001 | Test whether a designated I/O element is ON and obtain a test result ANDed with a previous test result. |
| | TFA | 00 | 010 | Test whether a designated I/O element is OFF and obtain a test result ANDed with a previous test result. |
| | TNO | 00 | 011 | Test whether a designated I/O element is ON and obtain a test result ORed with a previous test result. |
| | TFO | 00 | 100 | Test whether a designated I/O element is OFF and obtain a test result ORed with a previous test result. |
| | TNE | 00 | 101 | Test whether a designated I/O element is ON, obtain a test result ORed with a previous test result, and incorporate the test result into a previous AND test result. |
| | TFE | 00 | 110 | Test whether a designated I/O element is OFF, obtain a test result ORed with a previous test result, and incorporate the test result into a previous AND test result. |

TABLE 1-continued

| Command Words | | Codes | | Meaning |
|---|---|---|---|---|
| | NOP | 00 | 000 | Execute nothing but increment by one the content of program counter. |
| Jump Commands | JMY | 100 | | Jump to a memory address designated in the operand portion if the test flag indicates satisfaction of a final test result. |
| | JMN | 101 | | Jump to a memory address designated in the operand portion if the test flag indicates non-satisfaction of a final test result. |
| | JMP | 110 | | Unconditional jump to a memory address designated in the operand portion. |
| Output Commands | YON | 010 | 00 | Energize a designated output element if the test flag indicates satisfaction, or deenergize the designated output element if the test flag indicates non-satisfaction. |
| | SON | 010 | 01 | Unconditional energization of a designated output element. |
| | SOF | 010 | 10 | Unconditional deenergization of a designated output element |
| Arithmetic Operation Commands | ADD | 111 | 00 | Add data in A-register with data in B-register and write the sum in A-register. Energize an internal dummy designated in the operand portion. |
| | SUB | 111 | 01 | Subtract data in B-register from data in A-register and write the difference in A-register. Energize an internal dummy designated in the operand portion. |
| | CMP | 111 | 10 | Compare data in A-register with data in B-register and energize output elements of addresses advancing by 1, 2 and 3 from an address designated in the operand portion respectively if the result of comparison indicates $A > B$, $A = B$ or $A < B$. |
| | TRR | 111 | 11 | Transfer data from a device designated by a contiguous sequence instruction to a device designated by a further contiguous sequence instruction and energize an internal dummy designated in the operand portion. |
| Monitoring Command | RQI | 011 | 10 | Execute a monitoring program designated in the operand portion. |

Figure 3:
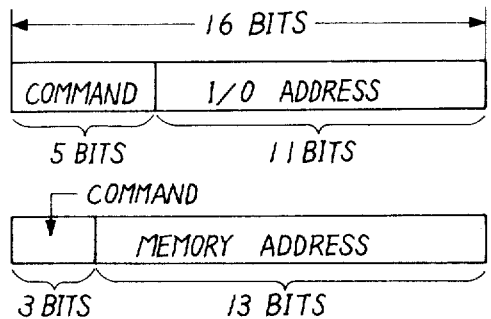
FIG. 3 is an explanatory representation showing the formats of sequence instructions.

The test commands, jump commands and output commands are those which can be executed by a conventional programmable sequence controller of a logic operation type, while the arithmetic operation commands and the monitoring command are those which cannot be executed by the conventional programmable sequence controller. FIG. 3 shows the formats of sequence instructions including these command words. Each of the sequence instructions except for jump and transfer instructions stores its coded command at the more significant 5-bits and also stores I/O address data for designation of an I/O element or an internal dummy output at the less significant 11-bits. The monitoring instruction stores at the less significant 11-bits one of the coded commands indicative of the kinds of monitorings. Further, each of the jump instructions stores one of the coded jump commands at the more significant 3-bits and also stores at the less significant 13-bits a memory address to which a jump is effected.

Figure 4:
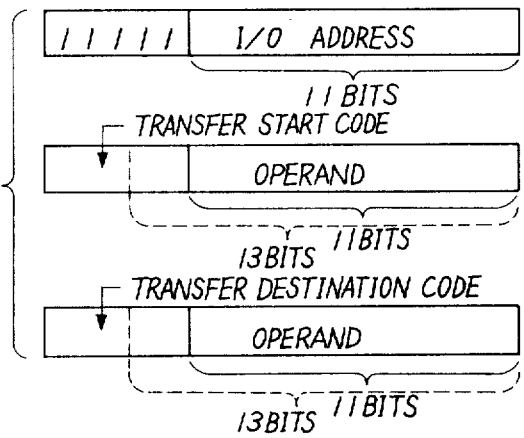
FIG. 4 is a table illustrative of the allocation of transfer address codes to device components.

The transfer instruction is used for transferring data stored in the sequence program memory 30 or in any of the I/O units 10-18 into a A-register 32 or into a B-register 33 and for transferring the result of an arithmetic operation to the sequence program memory 30 on to the D-A converter 18, prior to the execution of any of the addition, subtraction and comparison instructions. The transfer instruction is constituted by three successive instruction words and stores in the first word a coded transfer command and address data designating an internal dummy output. The second and third words of the transfer instruction respectively store therein a transfer start code designating the kind of a device from which data is to be read out and a transfer destination code designating the kind of a device to which data is to be delivered. FIG. 4 shows the allocation of the transfer start and destination codes to various devices. In any of the second and third words which stores the transfer start or destination code designating the I/O units 10-18 or the sequence program memory 30, address data is additionally stored at the operand portion for designating one of the I/O units 10-18 or one of memory addresses of the sequence program memory 30.

Figure 5:
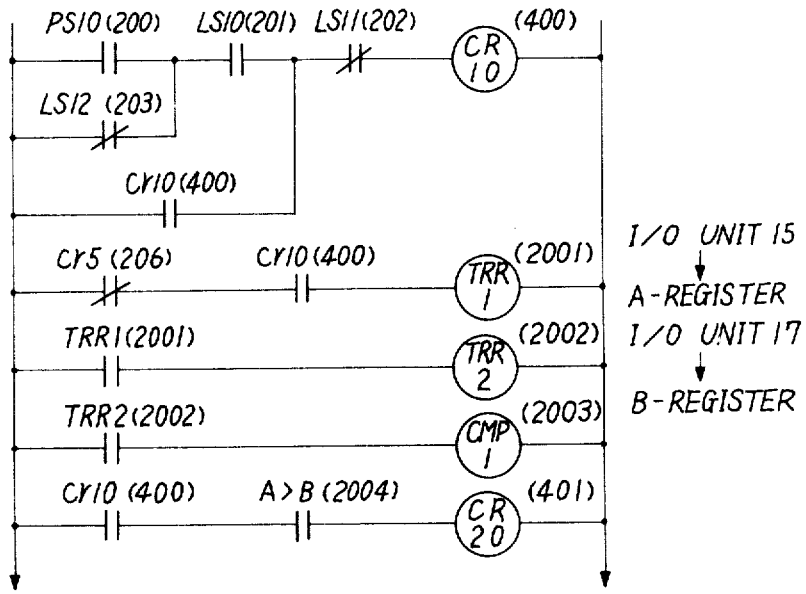
FIG. 5 is one example of the ladder diagram of a relay logic circuit.

One example of sequence control operations that the sequence controller according to the present invention is able to execute is illustrated in the form of a relay ladder circuit in FIG. 5, wherein each numeral within parentheses "( )" indicates an I/O address to which a related element is assigned or connected. The function of this ladder circuit is to transfer data set in the digital setting device 15 and data applied from the A-D converter 77 respectively to the A and B-registers 32, 33 when the energization of a relay CR10 and the deenergization of a relay CR5, not shown are ANDed or simulataneously effected, then to compare these data with each other, and to energize a relay CR20 when it is confirmed by the comparison that the data in the B-register 33 is smaller in number than that in the A-register 32. FIG. 6 shows a program sheet, on which a sequence program which is to be stored from address "100" of the sequence program memory 30 for enabling the sequence controller to perform the same function as the ladder circuit is drawn up using the command words listed in TABLE 1. The sequence program is loaded by means of a conventional program loader, not shown, into the sequence program memory 30, so that the sequence controller is enabled to perform the same function as the ladder circuit shown in FIG. 5.

Referring now back to FIGS. 1A-B, description will be made hereinafter with an operation processing section which serves to successively read out the sequence instructions from the sequence program memory 30 and to execute the read out instructions. The operation processing section comprises a logic operation section 101 and an arithmetic operation section 102. The logic operation section 101 is composed of a microprogram memory 40, a model 3001 microprogram control unit (hereinafter called "MCU") 41 commercially available from Intel Corporation, Santa Clara, California, a pipeline register 42, a data selector 43 and an inverter 44 and in addition to these components, is provided with a flip-flop FF1, an address register 45 and a multiplexer 46 for interruption processings. On the other hand, the arithmetic operation section 102 is composed of a conventional digital microprocessor 50, a microprocessor memory 51, a first buffer register 52 and a gate G5 and is further provided with a second buffer register 53 and a flip-flop FF2 for interruption processings. The sequence controller further comprises an RQ-register 54 for storing data indicating one kind of monitoring and an interface 55 for connecting the microprocessor 50 with an external data input/output device such as a tele-typewriter TTY.

Figure 7:
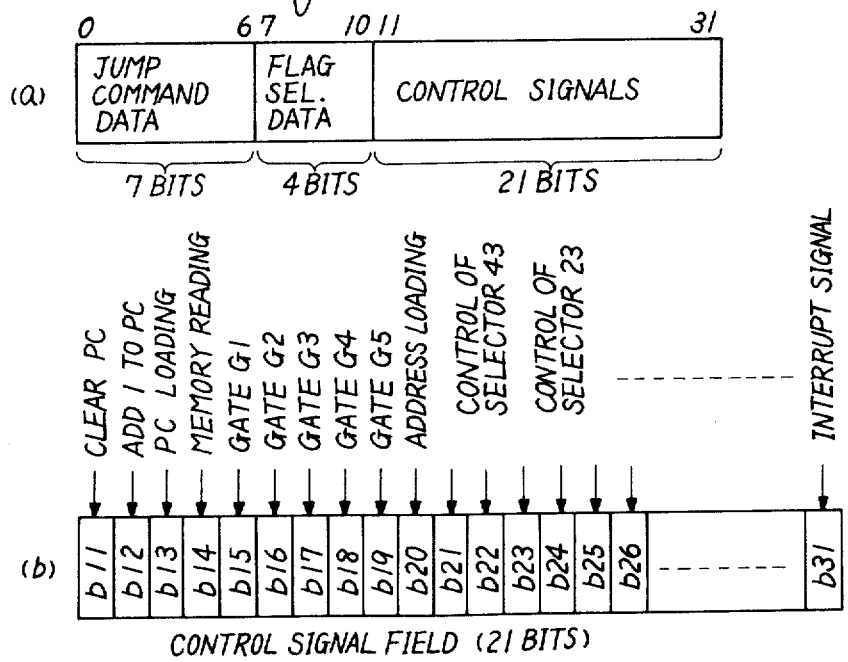
FIG. 7 is an explanatory representation showing the construction of each microprogram instruction.

The details of the operation processing section will be described hereinafter. The microprogram memory 40 is constructed from a read-only semiconductor memory and has stored therein a microprogram for controlling the reading-out and the execution of the sequence control program. The word length of the microprogram memory 40 is larger in bit number than that of memories for computers usually used in the art and in this embodiment, is constituted by 32-bits. As shown in FIG. 7(a), each data field of the 32-bits constituting one word is divided roughly into three and stores a jump command executed by the MCU 41, selection data for flags provided as referred to later in the MCU 41 and control signals for reading-out controls of the sequence control program respectively at the more significant 7-bits, at the middle 4-bits and at the less significant 21-bits. The less significant 21-bits storing the control signals are assigned respectively to related controlled objects and as shown in FIG. 7(b), serve as, for example, bits b11-14 for controlling the data reading-out from the sequence program memory 30 and the stepping-up of the program counter 31, bits b15-19 for controlling the switchings of the gates G1-G5, a bit b31 for applying an interrupt signal to the microprocessor 50 and other bits b20-30 for other purposes including the designation of the kind of processing imposed on the microprocessor 50 to perform. The control signals appearing on the less significant 21-bits are parallelly output whenever any word of the microprogram is read out. An unconditional or conditional jump command is stored as the jump command at the more significant 7-bits of each word of the microprogram. The unconditional jump command is used for sequentially reading out a plurality of words of the microprogram, while the conditional jump command is used for altering an address to which a jump is made, based upon the status of one of the flags or for effecting a jump from a certain routine to another routine of the microprogram in accordance with a sequence instruction read out from the sequence program memory 30.

Of the 32-bit data read out from the microprogram memory 40, the jump command data on the more significant 7-bits is given directly to an address control terminal AC of the MCU 41, and the flag selection data on the middle 4-bits is applied to a flag control terminal FC of the MCU 41 through the pipeline register 42. The control signals on the less significant 21-bits are applied to the pipeline register 42 and are delivered therefrom respectively to gates G1-G5, the program counter 31, the data selectors 23 and 43, and other components of the sequence controller. The pipeline register 42 serves to store the data read out from the microprogram memory 40 during one cycle of a train of control clocks, referred to later, whereby the control signals MCS are prevented from being unstabilized when the memory address of the microprogram memory 40 is switched from one to another.

The MCU (microprogram control unit) 41 is responsive to the jump command data output from the microprogram memory 40, data applied to its command input terminal PX-SX and the statuses of C and Z-flags 47, 48 for sending data indicative of a memory address from which a microprogram instruction is to be read out in a successive cycle, from an address output terminal M thereof to an address input terminal ADD of the microprogram memory 40. Further, the MCU 41 is arranged to perform the reading-out and execution of sequence instructions in accordance with the microprogram being stored in the microprogram memory 40. The MCU 41 is operated synchronously with a train of control clocks CLK applied from a clock generating circuit 49. The MCU 41, when so operated, produces data indicative of a memory address from which a microprogram instruction is to be subsequently read out and controls the microprogram memory 40 to read out the microprogram instruction by applying the produced data to the microprogram memory 40, during one cycle of the control clocks CLK. In the above-noted model-3001 MCU, although the period of one cycle of the control clocks CLK can be shortened to eighty-five nanoseconds, it is preferred to use a train of control clocks CLK whose period of one cycle is set within the range of several hundred nanoseconds to one microsecond in taking stability against noises into consideration. The C and Z-flags 47, 48 provided in the MCU 41 are constructed respectively by flip-flops and in this embodiment, are used for respectively storing the result of one or more AND tests and the result of one or more OR tests. As mentioned previously, the C and Z-flags 47, 48 are controllable by the flag selection data included in each instruction of the microprogram, so that it is possible to write into any of the C and Z-flags 47, 48 a signal applied to an input terminal FI of the MCU 41 and to output from an output terminal FO of the MCU 41 a signal indicating the status of any of the C and Z flags 47, 48. It is also possible for the MCU 41 to compulsorily output a signal "1" or "0" from the output terminal FO. The input terminal FI of the MCU 41 is connected to the data selector 43 so as to selectively receive the ON-OFF signal IOS of an I/O element selected by the bit selector 22, the inverted ON-OFF signal $\overline{IOS}$ from the inverter 44, a control signal MCS and a signal output from a set output terminal Q of the interruption flip-flop FF1. The MCU 41 is able to write into any of the C and Z-flags any of these signals applied to the input terminal FI and to read any of these signals as a condition in a conditional jump command for altering an address to which a jump is made. More specifically, the control signal MCS is used to initialize the C and Z-flags 47 and 48, the ON-OFF signal IOS and the inverter ON-OFF signals are used to change the statuses of the flags 47 and 48, and the signal from the flip-flop FF1 is used to detect an interrupt from the arithmetic operation section 102 with the result of jumping to an interruption processing routine. In addition, the MCU 41 is given a priority interruption function, in which when an interrupt signal $\mu$IS from the arithmetic operation section 102 is supplied to a load terminal LD of the MCU 41, a jump is effected to a memory address designated by address data applied to a command input terminal PX-SX. The multiplexer 46 is connected to selectively apply address data appearing on the main data bus MDB and address data which is stored in the data register 45 by the microprocessor 50, to the terminal PX-SX of the MCU 41 in response to one of the control data signal MCS. Thus, by controlling the multiplexer 46, it is possible to apply an interrupt to the MCU 41 so as to cause the same to jump its processing to a memory address designated by the microprocessor 50.

As the microprocessor 50 constituting the arithmetic operation section 102, there is employed a model TMS9900 microprocessor manufactured by Texas Instruments Incorporated, which executes arithmetic operation instructions, comparison instructions, transfer instructions, etc. included in the sequence control program. Since the microprocessor 50 of this type itself is well-known in the art, description will hereinafter be made mainly with cooperation between the microprocessor 50 and its peripheral devices. By applying address data on the address data bus ADB, the microprocessor 50 is accessible not only to the microprocessor memory 51, but, when the gates G4 and G5 are opened, also directly to the sequence program memory 30. Any address data applied on the address data bus ADB is decoded by an address decoder, not shown, so as to be used for selection of the A-register 32, the B-register 33, the address register 45, the buffer register 52, the RQ register 54, the interface 55 and the second flip-flop FF2. Thus, the microprocessor 50 is able to read thereinto data being stored in any selected one of these peripheral devices and to transfer data being stored within itself to any selected one of these peripheral devices. A data exchange is also executed between the main data bus MDB and the microprocessor 50 when the gate G5 is opened. The function of the buffer register 52 is to temporarily maintain the applications of control signals $\mu$CS to many system components of the sequence controller and the application of an interrupt signal $\mu$IS to the MCU 41. Further, the microprocessor 50 is given an interrupt function, in which the microprocessor 50, when receiving a signal at its interrupt input terminal INT, jumps its processing to a memory address designated by address data stored in the buffer register 53.

FIG. 8 shows a program memory map of the microprocessor memory 51, wherein a jump processing program is stored at address numbers 0 to 83 and an RQI processing program is stored at address numbers 64 to 127. The jump processing program is programmed to choose a memory address to which a jump is to be effected, by reading address data being designated in the buffer register 53. The RQI processing program is programmed to read data indicative of the kind of a monitoring from the RQ register 54 with a result of jumping to a monitoring program suitable to the kind of the monitoring. At memory addresses starting from address number 128, there are successively stored an addition program, a substraction program, a comparison program and a transfer program, which are selectively executed so as to execute any addition instruction ADD, any subtraction instruction SUB, any comparison instruction CMP and any transfer instruction TRR included in the sequence control program. An interrupt processing program stored from address number 176 is programmed to enable the MCU 41 to execute a successive instruction of the sequence control program by applying an interrupt thereto after the execution by the microprocessor 50 of an arithmetic operation instruction. Stored from address number 192 are monitoring programs of various kinds, one of which is executed when a monitoring instruction RQI included in the sequence control program is read out. By way of example, these monitoring programs are executed for outputting from the tele-typewriter TTY the listing of the sequence instructions being stored in the sequence program memory 30 and for displaying on an external display device, not shown, the status of any desired I/O element and cycle numbers indicative of the progress of a sequence control in operation. Memory addresses starting from address number 2048 are utilized as a storage area for temporarily storing intermediate results in the course of arithmetic operation processings and are constituted by a rewritable semiconductor memory.

OPERATION

The operation of the operation processing section as constructed above will be described with reference to flow charts shown in FIGS. 9A-F and 10-15. With the depression of an operation start switch, not shown, the generation of the control clocks CLK is initiated to enable the MCU 41 to start its operation. Thus, the MCU 41 jumps its processing to a memory address designated by a start address generating circuit, not shown, so as to initiate the reading-out of microprogram instructions from the microprogram memory 40.

As several microprogram instructions being stored at addresses contiguous to the start address are then successively read out, the program counter 31 is cleared to indicate zero and preparation is made by writing a signal "1" into the C and Z-flags 47, 48 of the MCU 41, namely by setting these flags 47, 48. The clearing of the program counter 31 is effected by a signal "1" appearing on the eleventh bit b11 as shown in FIG. 7(b) of a microprogram instruction read out from the memory 40 and applied to a clear terminal CLEAR of the program counter 31. In the write cycle of the signal "1" into the C and Z-flags 47 and 48, a next contiguous microprogram instruction is read out from the memory 40 so as to apply to the data selector 43 a 1-bit input signal "1" and 3-bit selection data included in the control signal field of the instruction, whereby the input signal "1" is selected and applied to the input terminal FI of the MCU 41. At the same time, 4-bit data which is included in the flag selection data field of the read-out microprogram instruction is applied to the flag control terminal FC of the MCU 41, so that the same is enabled to write the input signal "1" into both of the C and Z-flags 47, 48. It is noted herein that the microprogram in the memory 40 includes instructions to rewrite the status of the C-flag 47 from "1" to "0" if the result of one or more AND tests indicates non-satisfaction and to rewrite the status of the Z-flag 48 from "1" to "0" if the result of one or more OR tests indicates satisfaction and that instructions are also included in the microprogram so as to rewrite or not to rewrite the status of the C-flag 47 in dependence upon the status of the Z-flag 48 at the end of the execution of a series of OR tests.

Upon completion of the processings for intialization, the MCU 41 is caused to advance its processing to a reading-out routine for the sequence control program. In the beginning of this reading-out routine, the MCU 41 ascertains whether or not an interrupt has been applied from the microprocessor 50 by checking the status of the flip-flip FF1 in a step 203 of FIG. 9A. Any interrupt that the microprocessor 50 may have applied in the course of the execution of a previous sequence instruction can be detected by this step. It will be readily understood that the interrupt ascertaining is executed in accordance with a successive microprogram instruction which is read out from a memory address designated in the jump command data field, as shown in FIG. 7(a), of the preceding microprogram instruction. If the flip-flop FF1 has been set indicating the presence of an interrupt from the microprocessor 50, then the processing of the MCU 41 is jumped to a gate switching routine including steps 220-222. However, because no interrupt is applied from the microprocessor 50 in the execution of any sequence instruction except for that including the monitoring command RQI, the processing of the MCU 41 is jumped to a step 204 for reading out a successive sequence instruction. In this step 204, a control signal MCS is applied through an OR gate 34 to a read/write control terminal R/W of the sequence program memory 30, from which there is read out a sequence instruction of address number "0" designated by the program counter 31. Since in conventional core memories, about 1.5-microseconds (μs) is taken from the time that an address is designated until the time that the read-out data becomes reliable, null microprogram instructions of several words are executed during the reading-out of any sequence instruction from the core memory 30. For example, in the case where the period of one cycle of the control clock CLK applied to the MCU 41 is determined to be 300-milliseconds (ms), five-null microprogram instructions are executed during the reading-out of one sequence instruction.

When the reading-out of one sequence instruction is completed in this manner, a control signal MCS is applied in a step 205 to the address counter 20, which is thus caused to load thereinto I/O address data included in the less significant 11-bits of the read-out sequence instruction. This results in selecting an I/O element designated by the I/O address data, and the ON/OFF signal $\overline{IOS}$ of the selected I/O element is output from the bit selector 22. Alternatively, when an I/O unit selected by the I/O address data is the digital setting device 15, the A-D converter 17 or the like, then 8-bit data from the selected I/O unit is applied to the gate G1 through the input data bus IDB.

In accordance with successive several microprogram instructions, decoding is carried out in a step 206 with a coded command included in the more significant 5-bits of the read-out sequence instruction, and a jump is then effected to a processing routine that the decoded command designates. If in this time, a signal "0" has been written in the C-flag 47 which is provided for storage of the result of AND tests, the executions of successive AND tests are unnecessary because it is meant by the C-flag 47 that the condition to energize an output element has already been unsatisfied. To this end, in the case of any test command, it is ascertained in a step 207 of FIG. 9B whether the status of the C-flag 47 indicates "0" or not, and in dependence upon the status of the C-flag 47, the processing of the MCU 41 is either jumped to a step 208 for branching or returned to a step 202 of FIG. 9A for incrementing by one the content of the program counter 31. In the case of any output command, the 8-bit data appearing on the input data bus IDB is loaded into the data rewriting circuit 24 in a step 209 in advance of branching. This is a preparation for the execution of any output command, and when the same is subsequently executed, the loaded 8-bit data has its one bit rewritten and is sent back to the output units 12-14. In each of steps 208, 210 and 211, branching is executed based upon less significant bits of each decoded command.

Processing routines for respectively executing the commands of the sequence control program will be described hereinunder. Any of these processing routines is composed of microprogram instructions of several words, and an unconditional jump command for returning to the aforenoted read-out routine is included at the end of any of processing routines programmed for logic operations with which the microprocessor 50 is not concerned.

EXECUTIONS OF TEST COMMANDS

Figure 9A:
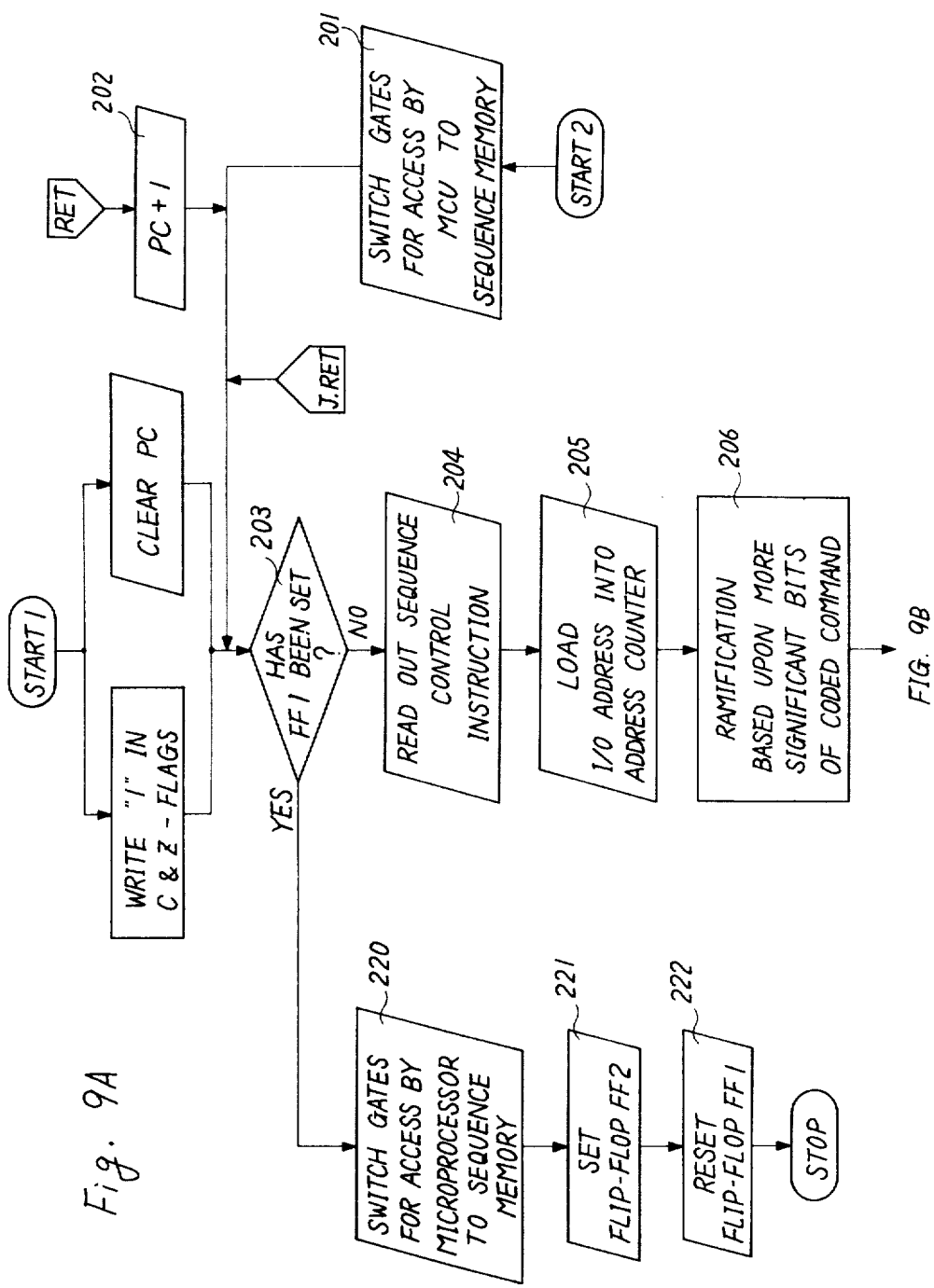
Figure 9C:
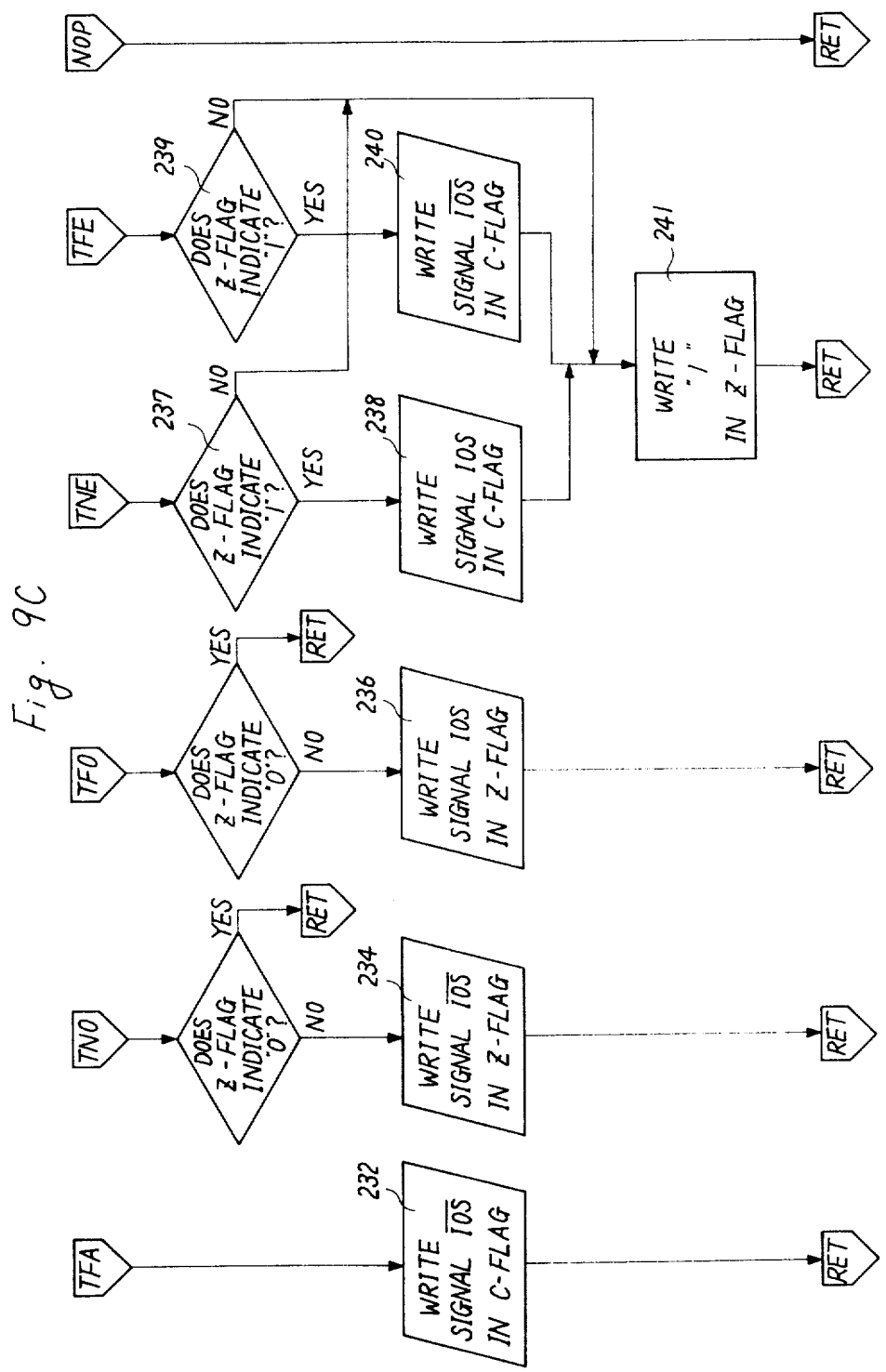
Figure 9D:
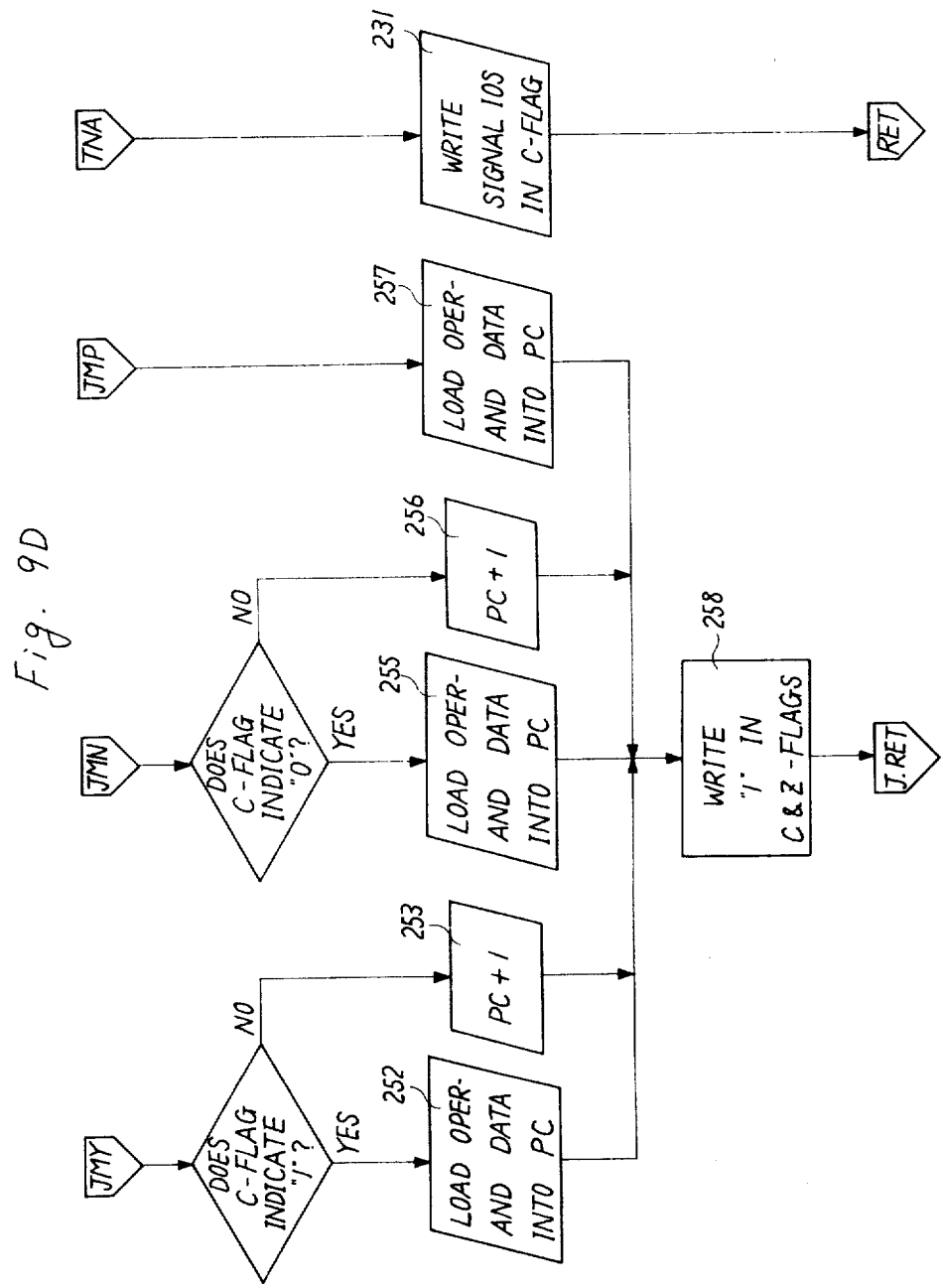

FIGS. 9C-D show processing routines for executing the test commands. When a test instruction including the "TNA" command is read out from the memory 30, the MCU 41 jumps its processing to a step 231 designated by an address data that a part of jump command data applied to the address control terminal AC and a part of the coded test command applied to the data input terminal PX-SX through the multiplexer 46 constitute together. The MCU 41 executes the test instruction by reading into the C-flag 47 the ON/OFF signal $\overline{IOS}$ of a selected I/O element output from the data selector 43. As recalled herein, the data selector 43 in this embodiment is controlled to output a signal "1" when the selected I/O element is ON and to output a signal "0" when it is OFF. Accordingly, the execution of the "TNA" command causes the C-flag 47 to maintain the signal "1" if the test result is satisfied or to store the signal "0" therein if the test result is unsatisfied. The "TFA" command is for testing whether a selected I/O element is OFF or not under AND logic, and therefore, a sequence instruction including the "TFA" command, when read out from the memory 30, is executed in a step 233 by writing into the C-flag 47 the signal $\overline{IOS}$ into which the ON/OFF signal IOS of a selected I/O element is inverted through the inverter 44.

The "TNO" command is for testing whether a selected I/O element is ON or not under OR logic, and the "TFO" command is for testing whether a selected I/O element is OFF or not under OR logic. Therefore, when an instruction including the "TNO" command is read out from the memory 30, the MCU 41 executes the instruction in a step 234 by reading the inverted signal $\overline{IOS}$ into the Z-flag 48. Further, when an instruction including the "TFO" command is read out from the memory 30, the MCU 41 executes the instruction in a step 236 by reading the ON/OFF signal IOS of a selected I/O element into the Z-flag 48. When the Z-flag 48 is in a "0" state, it is meant that the result of a group of OR tests has already been satisfied and thus, the execution of the successive OR tests within the group is unnecessary. For this reason, the MCU 41 tests in advance of any of the steps 234 and 236 whether the Z-flag 48 is in the "0" state or not and returns its processing to the sequence program read-out routine if the flag 48 is in the "0" state.

Any of the "TNE" and "TFE" commands is used in the last one of a group of OR tests for indicating the result of the group of the OR tests as the result of one AND test. Assuming now that the Z-flag 48 is maintained in the "1" state until before the execution of the last one of the OR tests, the result of the group of the OR tests is satisfied if, although none of previous OR tests results is satisfied, the result of the last OR test is satisfied, and is unsatisfied if the result of the last OR test is unsatisfied. Therefore, when an instruction including any of these test commands is read out from the memory 30, the MCU 41 tests in a step 237 or a step 239 whether the Z-flag 48 is in the "1" state or not. When the Z-flag 48 is in the "1" state, the MCU 41 writes the ON/OFF signal IOS of a selected I/O element or the inverted signal IOS thereof into the C-flag 47 in a step 238 or in a step 240, whereby the result of the group of the OR tests is incorporated into AND logic; in other words, it is indicated as the result of one AND test. In a step 241, the MCU 41 writes the signal "1" into the Z-flag 48, so that the same is initialized or caused to be ready for another group of OR tests. In addition, when an instruction including the "NOP" command is read out, the MCU 41 unconditionally jumps its processing to the read-out routine without controlling the C and Z-flags 47 and 48 since the "NOP" command is intended to execute nothing, so that a next contiguous sequence instruction is then read out.

EXECUTIONS OF JUMP COMMANDS

FIG. 9D shows a processing routine for jump commands. When a sequence instruction including any of the "JMY" and "JMN" (conditional jump) commands is read out from the memory 30, the MCU 41 decides in dependence upon the status of the C-flag 47 either to increment the content of the program counter 31 by one or to load thereinto address data included in the operand portion of the read-out instruction. That is, the MCU 41 jumps its processing either to a step 252, 255 or to a step 253, 256 in dependence upon the status of the C-flags 47. In any of the steps 252, 255 and a step 257 referred to later, a microprogram instruction including a control signal MCS to be applied to the load terminal LOAD of the program counter 31 is read out from the microporgram memory 40, so that the address data of the read-out instruction appearing on the main data bus MDB is loaded into the program counter 31. In any of the steps 253 and 256, a microprogram instruction including a control signal MCS to be applied to the step-up terminal t1 of the counter 31, so that the content of the same in increased by one. When a sequence instruction including a "JMP" (unconditional jump) command is read out from the memory 30, the step 257 is executed, wherein address data included in the operand portion of the read-out instruction is loaded into the program counter 31. The MCU 41 is subsequently caused to jump its processing to a step 258, in which the signal "1" is written in both of the C and Z-flags 47, 48 for initialization. This prevents the result of tests executed before this jump from being influenced on tests which will be executed thereafter.

EXECUTIONS OF OUTPUT COMMANDS

FIG. 9E shows a processing routine for output commands. When a sequence instruction including the "YON" (conditional output) command is read out from the memory 30, the MCU 41 jumps its processing to a step 261 to output from the flag output terminal FO a signal indicative of the state of the C-flag 47, and thus, a selected output element is energized or deenergized in dependence upon the status of the C-flag 47. If the C-flag 47 is in the "1" state because of the test result satisfied, the signal "1" is applied to the data rewriting circuit 24 so as to rewrite the signal status of one bit of 8-bit I/O data associated with a selected I/O element. Since the rewritten 8-bit I/O data is sent back to the output units 12-14 through the output data bus ODB, it is received into a selected one of the output units 12-14 when a control signal mCS for latch is applied onto the signal line LSL, so as to energize the selected output element. On the contrary, if the C-flag 47 is in the "O" state because the test result is unsatisfied, the "O" signal is supplied to the data rewriting circuit 24 so as to deenergize a selected output element. Further, when an instruction including any of the "SON" and "SOF" (unconditional output) commands is read out from the memory 30, the MCU 41 jump its processing to a step 262 to output the signal "1" from the output terminal FO or to a step 263 to output the signal "0" from the output terminal FO. Thus, the signal status of a selected one bit of the 8-bit I/O data is rewritten in the data rewriting circuit 24 regardless of the test result stored in the C-flag 47, whereby a selected output element is energized or deenergized. Following this, the initialization of the C and Z-flags is executed for the same purpose as that in the case of the jump commands, and thus, the result of tests executed before an output command is prevented from influencing tests which will be executed thereafter.

EXECUTIONS OF ARITHMETIC OPERATIONS

Figure 9F:
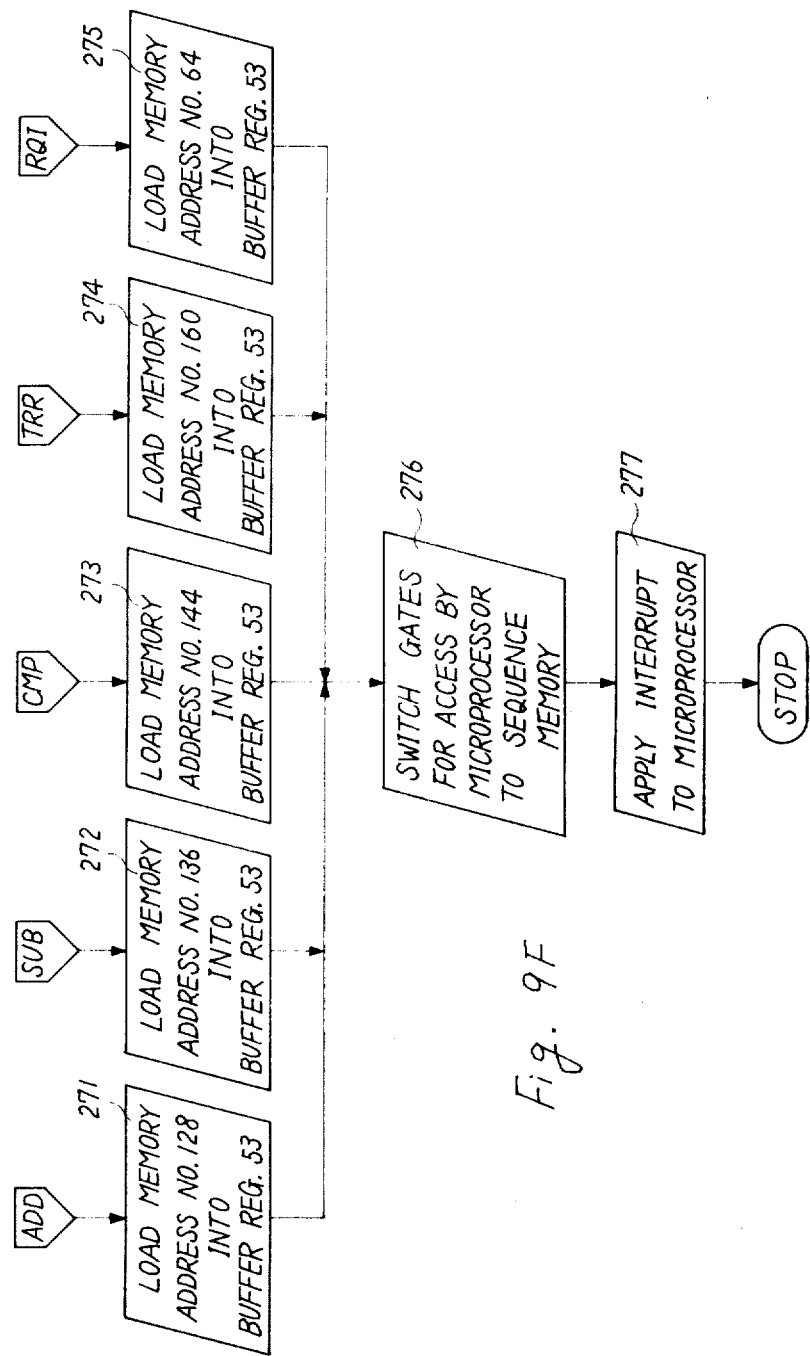

Description will be made hereinafter of operations for addition; subtraction etc. executed by the microprocessor 50. When a sequence instruction including any of the addition command ADD, the substraction command SUB, the comparison command COM, the transfer command TRR and the monitoring command RQI is read out from the memory 30, the MCU 41 jumps its processing to a step corresponding to one of these commands included in the read-out instruction. Microprogram instructions of several words as shown in FIG. 9F are stored in the microprogram memory 40 for enabling the MCU 41 to instruct the execution of one of the commands to the microprocessor 50. The processing of the MCU 41 is jumped to a step 271, 272, 273, 274 or 275, respectively when the command ADD, SUB, CMP, TRR or RQI is input to the MCU 41 through the multiplexer 46. In any of these steps 271 to 275, there is read out from the memory 40 a microprogram instruction including at the control signal field address designation data that designates a first address of a memory area storing a processing routine to be executed by the microprocessor 50 in correspondence to the read-out command. The address designation data indicates one of address numbers "128", "136", "144", "160" and "64" corresponding respectively to the commands ADD, SUB, CMP, TRR and RQI and is applied to the buffer register 53 for storage thereinto. The switchings of the gates G1 to G5 and the data selector 23 are effected in a successive step 276 so as to make the sequence program memory 30 and the I/O units 10-18 accessible by the microprocessor 50, and in a step 277, an interrupt is applied to the microprocessor 50. The MCU 41 is thereafter caused to stop its processing and to wait until receiving an interrupt from the microprocessor 50.

FIGS. 10-13 show processing routines executed by the microprocessor 50 for processing the commands ADD, SUB, TRR and COM, and one of these routines is executed when an interrupt is applied to the microprocessor 50. More specifically, when a read-out sequence instruction includes the addition command ADD, an addition routine shown in FIG. 10 is executed, in accordance with which data being stored respectively in the A and B-registers 32, 33 are read into the microprocessor 50 so as to be added with each other and the result of the addition is loaded into the A-register 32. When a read-out sequence instruction includes the subtraction command SUB, a subtraction routine shown in FIG. 11 is executed, in accordance with which data read out from the B-register 33 is subtracted in the microprocessor 50 from data read out from the A-register 32, and the result of the subtraction is loaded into the A-register 32.

When a read-out sequence instruction includes the transfer command TRR, the microprocessor 50 executes a transfer routine as follows: It is recalled herein that the transfer command TRR is for transferring data from a transfer start address, designated by address data of the next contiguous memory address, to a transfer destination address designated by address data of a memory address whose address order is behind by two from that of a memory address storing the transfer command. In the transfer routine, therefore, a control signal $\mu$CS is applied to the OR gates 35 so as to increment by one the content of the program counter 31 in the beginning, as shown in FIG. 12. The data indicative of the transfer start address is fetched from the memory 30 for decoding, and data being stored in the transfer start address designated by the fetched data is read into the microprocessor 50. By further incrementing by one the content of the program counter 31, data indicative of a transfer destination address is decoded by the microprocessor 50, and the data which is being stored in the microprocessor 50 after fetched from the transfer start address is then written into the transfer destination address.

Figure 13:
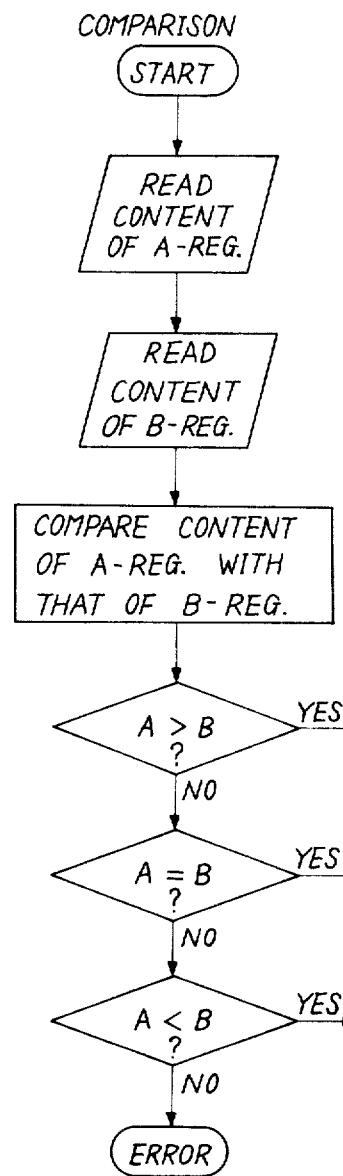

Further, when a read-out sequence instruction includes the comparison command CMP, the microprocessor 50 executes a comparison routine shown in FIG. 13, in accordance with which data fetched respectively from the A and B registers 32, 33 are compared with each other with respect to largeness in number. If the result of the comparison indicates a relation A>B, A=B or A>B, the content of the address counter 20 is incremented by one, two or three, respectively, so that an output element (internal dummy output) selected in dependence upon the result of the comparison is energized.

Figure 14:
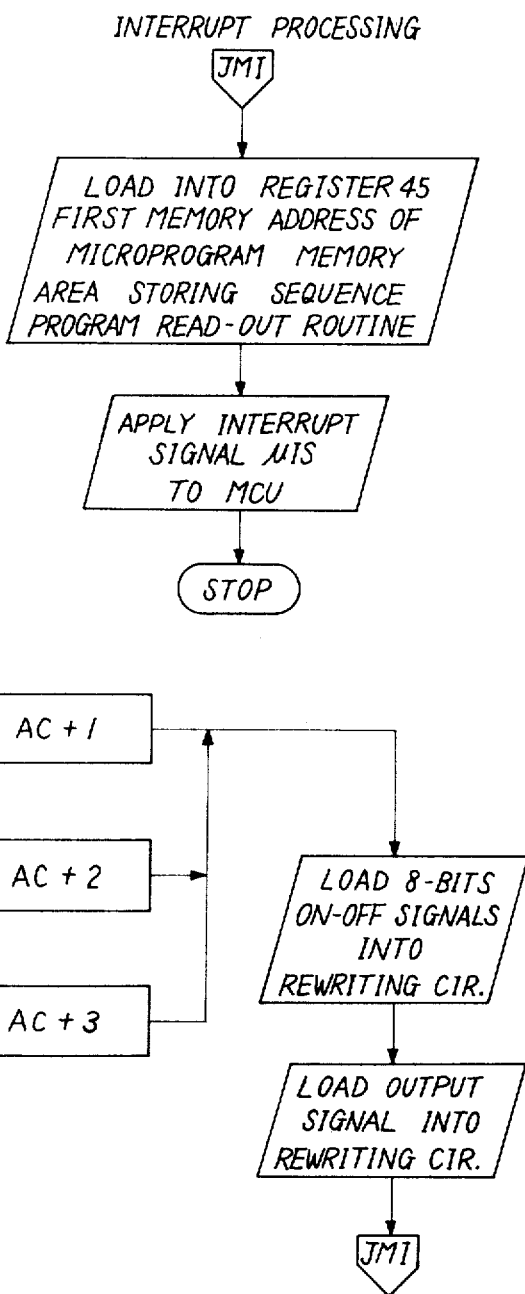

Upon completion of any of the foregoing addition, subtraction, transfer and comparison routines, the microprocessor 50 jumps its processing to an interrupt processing routine shown in FIG. 14. In this routine, the microprocessor 50 loads into the address register 45 for the MCU 41 data designating a first address of a memory area that stores the sequence instruction read-out routine to thereafter be executed by the MCU 41. The microprocessor 50 then applies an interrupt to the MCU 41 by sending an interrupt signal $\mu$IS. The microprocessor 50 is caused to stop its processing and to wait until receiving an interrupt thereto. On the other hand, the MCU 41, when receiving the interrupt, jumps its processing to the first address (the step 202 of FIG. 9A) of the memory area storing the read-out routine. Thus, the content of the program counter 31 is incremented with the result of reading out a successive sequence instruction from the memory 30.

As mentioned previously, when a read-out sequence instruction includes any of the addition command ADD, the subtraction command SUB, etc. to be executed by the microprocessor 50, an interrupt is applied to the microprocessor 50 in the step 277 of FIG. 9F after the switching control by the MCU 41 of the gates G1-G5 and the like and the processing of the MCU 41 is then halted. The microprocessor 50 therefore executes an arithmetic operation command such as ADD included in the read-out sequence instruction and upon completion of the execution of the command, applies an interrupt to the MCU 41, which is thus enabled to read out a successive sequence instruction in accordance with the microprogram being stored within the memory 40. The MCU 41 and the microprocessor 50 are controlled to operate alternately with each other, so that logic operation commands such as the test commands and arithmetic operation commands such as the addition, subtraction and comparison commands are sequentially executed. Accordingly, the result of an arithmetic operation or of a comparison immediately influences the successive execution of a sequence instruction including an output command, and it can be avoided that as takes place in the case of the prior art sequence controller, the result of an arithmetic operation or of a comparison influences the execution of an output command after one scan of a sequence control program composed of a series of sequence instructions. This makes it possible to perform reliable sequence control.

The execution of the monitoring command RQI will be described hereafter. By changing the monitoring program stored in the microprocessor memory 51, it is possible for the microprocessor 50 to execute various monitoring operations such as the typing-out by the teletypewriter TTY of the listing of the sequence control program or the monitoring of the ON/OFF states of the I/O elements. By way of example, description will be made hereinunder with the monitoring operation for typing-out the listing of the sequence control program.

In the case where the monitoring command RQI is used, the sequence control program stored in the memory 30 may include modifying instructions of desired words that are necessitated in executing a monitoring program stored in the microprocessor memory 51. In a particular instance wherein the monitoring operation is executed for typing-out the listing of a desired part of the sequence control program, two modifying instructions which respectively designate first and last addresses of a memory area storing the desired part to be listed up are included in the sequence control program, following the monitoring instruction RQI as shown in FIG. 16. For the purpose of simultaneously executing the monitoring instruction RQI and other sequence instructions except for those including the arithmetic operation commands, the sequence control program in the present embodiment includes therein an unconditional jump instruction JMP following the monitoring instruction RQI. With this software technique, the MCU 41 is enabled to apply an interrupt to the microprocessor 50 when the monitoring instruction RQI is read out, as shown in FIG. 17(b), and to subsequently execute the other sequence instructions which are programmed following the modifying instructions.

Figure 15:
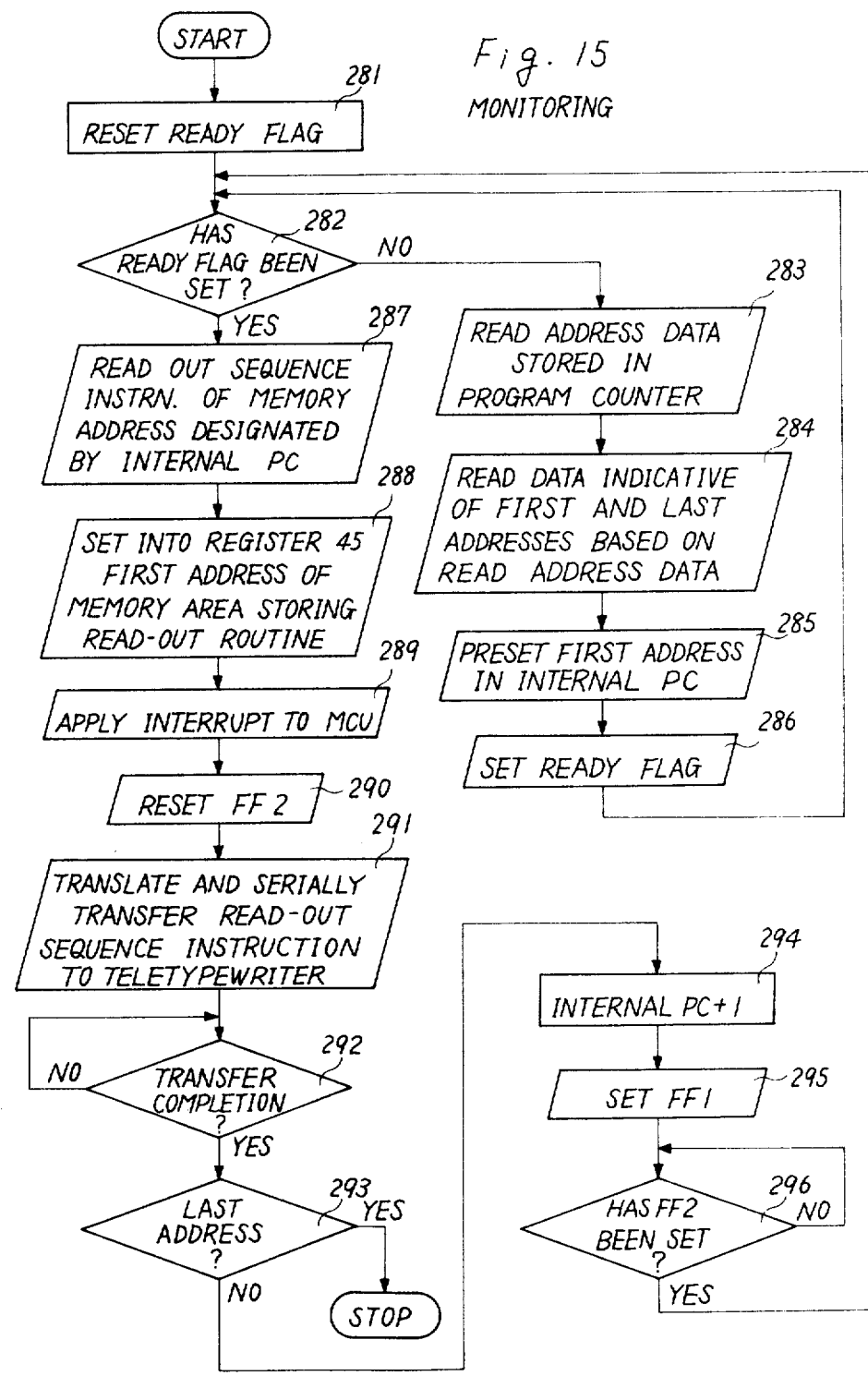

FIG. 15 shows a monitoring program stored in the microprocessor memory 51. This program is composed of a ready routine including steps 283–286 for fetching from the sequence program memory 30 the modifying instructions respectively designating the above-noted first and last addresses so as to load the first address into an internal program counter, not shown, provided in the microprocessor 50 and a transfer routine including steps 287–291 for fetching sequence instructions to be listed from the sequence program memory 30 one by one so as to translate and transfer the fetched sequence instructions to the teletypewriter TTY. The microprocessor 50 resets a ready flag, not shown, provided therein in a first step 281 of the monitoring program. It is ascertained in a next contiguous step 282 whether the ready flag has been set or not, and a jump is then made either to the ready routine if the ready flag has been reset, or to the transfer routine if it has been set. As the monitoring program has started from resetting the ready flag, the jump is made to the ready routine. This routine is initiated by opening the gate G6 so as to fetch address data from the program counter 31 and the data indicative of the aforementioned first and last addresses programmed following the jump instruction JMP are fetched from the sequence program memory 30 based upon the address data from the counter 31. The first address is preset into the internal program counter in advance of the setting of the ready flag, and thereafter, the microprocessor 50 returns its processing to the step 282 for ascertaining the status of the ready flag, thus resulting in the initiation of the transfer routine.

The transfer routine starts from reading out from an address of the memory 30 designated by the internal program counter a sequence instruction, which is then temporarily stored in an internal register, not shown, of the microprocessor 50 or in a part of the RAM area of the microprocessor memory 51. Following this, the microprocessor 50 presets into the address register 45 memory address data that designates a step 201 of the sequence program read-out routine (FIG. 9A) and then applies an interrupt to the MCU 41 by inputting an interrupt signal $\mu IS$ to the load terminal LD of the MCU 41. The MCU 41 is thus restarted and in the step 201, is enabled to make access to the sequence program memory 30 by switching gates GS–G5. From this time, it becomes possible for the MCU 41 to perform the reading-out and execution of sequence instructions simultaneously with the following processings by the microprocessor 50. On the other hand, the microprocessor 50 translates the sequence instruction which is being temporarily stored in the internal register or in a part of the RAM area, into data represented in the form of a so-called "ASCII" (American Standard Code of Information Interchange) code and transfers the translated data into a register, not shown, provided in the interface 55 letter by letter. Consequently, the translated sequence instruction is transferred serially to the teletypewriter TTY and is printed out therefrom in such a format as shown, in FIG. 6. Since the printing-out speed of the teletypewriter TTY is about 10 letters/second and each sequence instruction translated has about 6 letters in a programming language, it takes about 0.6 second to print out one sequence instruction, during which several tens of sequence instructions are executed. It will therefore be understood that nothing is influenced on sequence control even where the execution of sequence instructions and the listing of the sequence instructions are simultaneously carried out as is in the case of this embodiment.

When the transferring to the teletypewriter TTY is completed with data representing one sequence instruction, the microprocessor 50 ascertains whether or not the transferred data derives from a last sequence instruction that is to be listed and that is being stored in the aforementioned last address. If it does not derive from the last sequence instruction, the microprocessor 50 increments by one the content of the internal program counter before setting the flip-flop FF1. As the flip-flop FF1 is set, the MCU 41 advances its processing from the step 203 to the gate switching routine so as to switch the gates G1–G5, while the microprocessor 50 waits until the flip-flop FF2 is set. The microprocessor thereafter returns its processing to the step 282 and performs the reading-out of a successive sequence instruction so as to translate and transfer the same to the teletypewriter TTY. After the reading-out of the sequence instruction by the microprocessor 50, an interrupt is applied to the MCU 41, which from this time, is again enabled to perform the sequence control simultaneously with the listing of the sequence instructions by the microprocessor 50.

As described above, it is accomplished in the controller of this embodiment to simultaneously perform a monitoring operation such as the listing of sequence instructions and the execution of sequence control by including the monitoring instruction RQI within the sequence control program and by storing a predetermined monitoring program in the microprocessor memory 51. When the monitoring instruction RQI is read out from the sequence program memory 30, an interrupt is applied to the microprocessor 50, to which the execution of the monitoring instruction is then handed over. Accordingly, it is completely unnecessary to provide, as is the case of prior art, a memory for information exchange between a logic operation processor and an arithmetic operation processor and a switching circuit for enabling the memory to be accessible by both of the processors. Moreover, in the sequence controller of this embodiment, the extending of time for one scan cycle due to such information exchange can be avoided.

Although the above-described embodiment charges the logic operation processor with the switching control of the gates G1–G5, this gate switching control may otherwise be effected in response not only to signals from the logic operation processor but also to signals from the arithmetic operation processor.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A programmable sequence controller comprising in combination:
 a sequence program memory for storing a sequence control program composed of a plurality of sequence instructions, each of said sequence instructions including any one of a test command; an output command and an arithmetic operation command in addition to address data;

a program counter for selectively designating memory addresses of said sequence program memory so as to successively read out therefrom said sequence instructions;

input and output selecting means responsive to address data included in any sequence instruction read out from said sequence program memory for selectively designating a plurality of input and output elements;

logic operation processing means connected to said program counter for controlling the content of said program counter and also connected to said input and output selecting means and said sequence program memory for writing the operational status signal of any input element, designated by said input and output selecting means, into a test flag provided therein under a test condition designated by said test command supplied from said sequence program memory, said logic operation processing means being adapted to selectively output energization and deenergization signals based upon the status of said test flag when receiving said output command from said sequence program memory;

output drive means connected to said output elements, said input and output selecting means and said logic operation processing means for energizing or deenergizing any output element, designated by said input and output selecting means, in response to said energization and deenergization signals;

interrupting means included in said logic operation processing means for outputting a first interrupt signal when said logic operation processing means receives said arithmetic operation command from said sequence program memory;

arithmetic operation processing means including data storage means for receiving digital data from external devices and responsive to said interrupt signal for arithmetically processing said digital data;

wherein said logic operation processing means comprises:

a microprogram memory for storing a plurality of microprogram instructions;

an inverter for inverting said operational status signal of said any selected input elements;

a data selector responsive to one of said microprogram instructions read out from said microprogram memory for selectively outputting said operational status signal and the inverted signal thereof respectively as first and second status signals; and a microprogram control unit including said test flag therein and connected to said sequence program memory and said microprogram memory for applying memory address data to said microprogram memory upon each occurrence of receiving a first part of any sequence instruction and a first part of any microprogram instruction read out respectively from said sequence program memory and said microprogram memory, said microprogram control unit being connected to said data selector and said output drive means for writing one of said first and second status signals applied from said data selector into said test flag when receiving a second part of said one of said microprogram instructions and for selectively outputting said energization and deenergization signals to said output drive means in dependence upon the status of said test flag when receiving said second part of another microprogram instruction.

2. A programmable sequence controller as set forth in claim 1, wherein:

said arithmetic operation processing means comprises means for applying a second interrupt signal to said logic operation processing means when completing said arithmetic operation of said digital data; and said logic operation processing means comprises means for halting its processing after causing said interrupt means to apply said first interrupt signal to said arithmetic operation processing means until receiving said second interrupt signal from said arithmetic processing means.

3. A programmable sequence controller as set forth in claim 1, wherein:

said input and output selecting means comprises an address counter responsive to address data included in each of said sequence instructions for selecting an input or output element designated by said address data; and said arithmetic operation processing means is accessible to said address counter for controlling the counting operation of said address counter in dependence upon the result of said arithmetical operation.

4. A programmable sequence controller as set forth in claim 1, wherein:

said logic operation processing means is responsive to said second interrupt signal from said arithmetic operation processing means so as to immediately enable said arithmetic operation processing means to make access to said sequence program counter.

* * * * *